US011195028B2

(12) United States Patent
Lee et al.

(10) Patent No.: US 11,195,028 B2
(45) Date of Patent: Dec. 7, 2021

(54) REAL-TIME SIMULTANEOUS DETECTION OF LANE MARKER AND RAISED PAVEMENT MARKER FOR OPTIMAL ESTIMATION OF MULTIPLE LANE BOUNDARIES

(71) Applicant: QUALCOMM Incorporated, San Diego, CA (US)

(72) Inventors: Jeong-Kyun Lee, Seoul (KR); Young-Ki Baik, Seoul (KR); Seungwoo Yoo, Yongin-si (KR); Duck Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/733,148

(22) Filed: Jan. 2, 2020

(65) Prior Publication Data

US 2020/0218908 A1    Jul. 9, 2020

Related U.S. Application Data

(60) Provisional application No. 62/788,751, filed on Jan. 4, 2019.

(51) Int. Cl.
*G06K 9/62* (2006.01)
*G06K 9/46* (2006.01)
*G06K 9/00* (2006.01)

(52) U.S. Cl.
CPC ......... *G06K 9/00798* (2013.01); *G06K 9/469* (2013.01); *G06K 9/4661* (2013.01); *G06K 9/6202* (2013.01)

(58) Field of Classification Search
None
See application file for complete search history.

(56) References Cited

U.S. PATENT DOCUMENTS

| 2014/0177914 | A1* | 6/2014 | Kuehnle | G06T 7/60 382/103 |
| 2015/0210312 | A1* | 7/2015 | Stein | G06K 9/00805 701/41 |
| 2016/0180177 | A1* | 6/2016 | Nguyen | G06K 9/00798 382/104 |
| 2018/0173970 | A1* | 6/2018 | Bayer | G06K 9/00798 |
| 2018/0365859 | A1* | 12/2018 | Oba | B60R 1/00 |

* cited by examiner

*Primary Examiner* — Idowu O Osifade
(74) *Attorney, Agent, or Firm* — QUALCOMM Incorporated

(57) ABSTRACT

Disclosed are techniques for estimating multiple lane boundaries through simultaneous detection of lane markers (LM) and raised pavement markers (RPM). Conventional techniques for lane marker detection (LMD) comprises extracting and clustering line segments from a camera image, fitting the clustered lines to a geometric model, and selecting the multiple lanes using heuristic approaches. Unfortunately, in the conventional technique, an error from each step is sequentially propagated to the next step. Also there are no techniques to estimate both LMs and RPMs. A technique to simultaneously detect in real time both LM and RPMs is proposed. This enables optimal estimation of multiple lane boundaries.

30 Claims, 26 Drawing Sheets

FIG.14

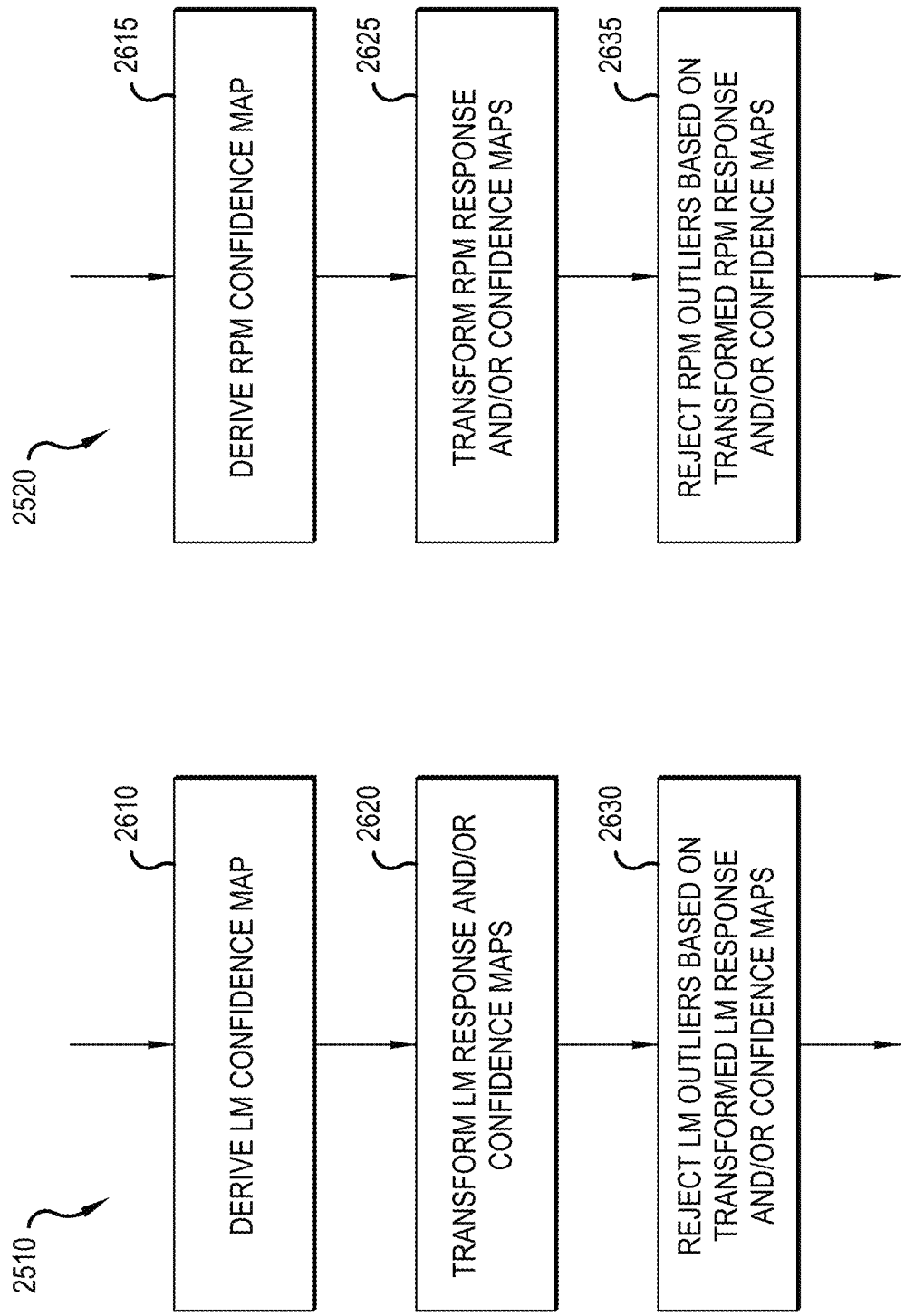

REAL-TIME SIMULTANEOUS DETECTION OF LANE MARKER AND RAISED PAVEMENT MARKER FOR OPTIMAL ESTIMATION OF MULTIPLE LANE BOUNDARIES

CROSS-REFERENCE TO RELATED APPLICATION

The present Application for Patent claims the benefit of U.S. Provisional Patent Application No. 62/788,751 entitled "REAL-TIME SIMULTANEOUS DETECTION OF LANE MARKER AND RAISED PAVEMENT MARKER FOR OPTIMAL ESTIMATION OF MULTIPLE LANE BOUNDARIES," filed Jan. 4, 2019, assigned to the assignee hereof, and expressly incorporated herein by reference in its entirety.

TECHNICAL FIELD

Aspects of this disclosure relate generally to real-time simultaneous detection of lane marker (LM) and raised pavement marker (RPM) for optimal estimation of multiple lane boundaries.

BACKGROUND

Modern motor vehicles are increasingly incorporating technology that helps drivers avoid drifting into adjacent lanes or making unsafe lane changes (e.g., Lane Departure Warning (LDW)), or that warns drivers of other vehicles behind them when they are backing up, or that brakes automatically if a vehicle ahead of them stops or slows suddenly (e.g., Forward Collision Warning (FCW)), among other things. The continuing evolution of automotive technology aims to deliver even greater safety benefits, and ultimately deliver Automated Driving Systems (ADS) that can handle the entire task of driving without the need for user intervention.

There are six levels that have been defined to achieve full automation. At Level 0, the human driver does all the driving. At Level 1, an Advanced Driver Assistance System (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of estimating lanes is disclosed. The method may comprise generating a lane marker (LM) response map from a first camera frame. The LM response map may indicate presence of one or more LMs within the first camera frame. The method may also comprise generating a raised pavement marker (RPM) response map from a second camera frame. The RPM response map may indicate presence of one or more RPMs within the second camera frame. The method may further comprise estimating the lanes based on the LM response map and the RPM response map.

In an aspect, an apparatus is disclosed. The apparatus may comprise a memory and a processor communicatively coupled to the memory. The memory and/or the processor may be configured to generate a lane marker (LM) response map from a first camera frame. The LM response map may indicate presence of one or more LMs within the first camera frame. The memory and/or the processor may also be configured to generate a raised pavement marker (RPM) response map from a second camera frame. The RPM response map may indicate presence of one or more RPMs within the second camera frame. The memory and/or the processor may further be configured to estimate the lanes based on the LM response map and the RPM response map.

In an aspect, another apparatus is disclosed. The apparatus may comprise means for generating a lane marker (LM) response map from a first camera frame. The LM response map may indicate presence of one or more LMs within the first camera frame. The apparatus may also comprise means for generating a raised pavement marker (RPM) response map from a second camera frame. The RPM response map may indicate presence of one or more RPMs within the second camera frame. The apparatus may further comprise means for estimating the lanes based on the LM response map and the RPM response map.

In an aspect, a non-transitory computer-readable medium storing computer-executable instructions for an apparatus is disclosed. The computer-executable instructions may comprise one or more instructions causing the apparatus to generate a lane marker (LM) response map from a first camera frame. The LM response map may indicate presence of one or more LMs within the first camera frame. The computer-executable instructions may also comprise one or more instructions causing the apparatus to generate a raised pavement marker (RPM) response map from a second camera frame. The RPM response map may indicate presence of one or more RPMs within the second camera frame. The computer-executable instructions may further comprise one or more instructions causing the apparatus to estimate the lanes based on the LM response map and the RPM response map.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 14 illustrates example images of the raised pavement marker templates, according to the techniques described herein.

FIGS. 23-26B illustrate flow charts of another example method for estimating lane boundaries, according to aspects of the disclosure.

DETAILED DESCRIPTION

Figure 1:
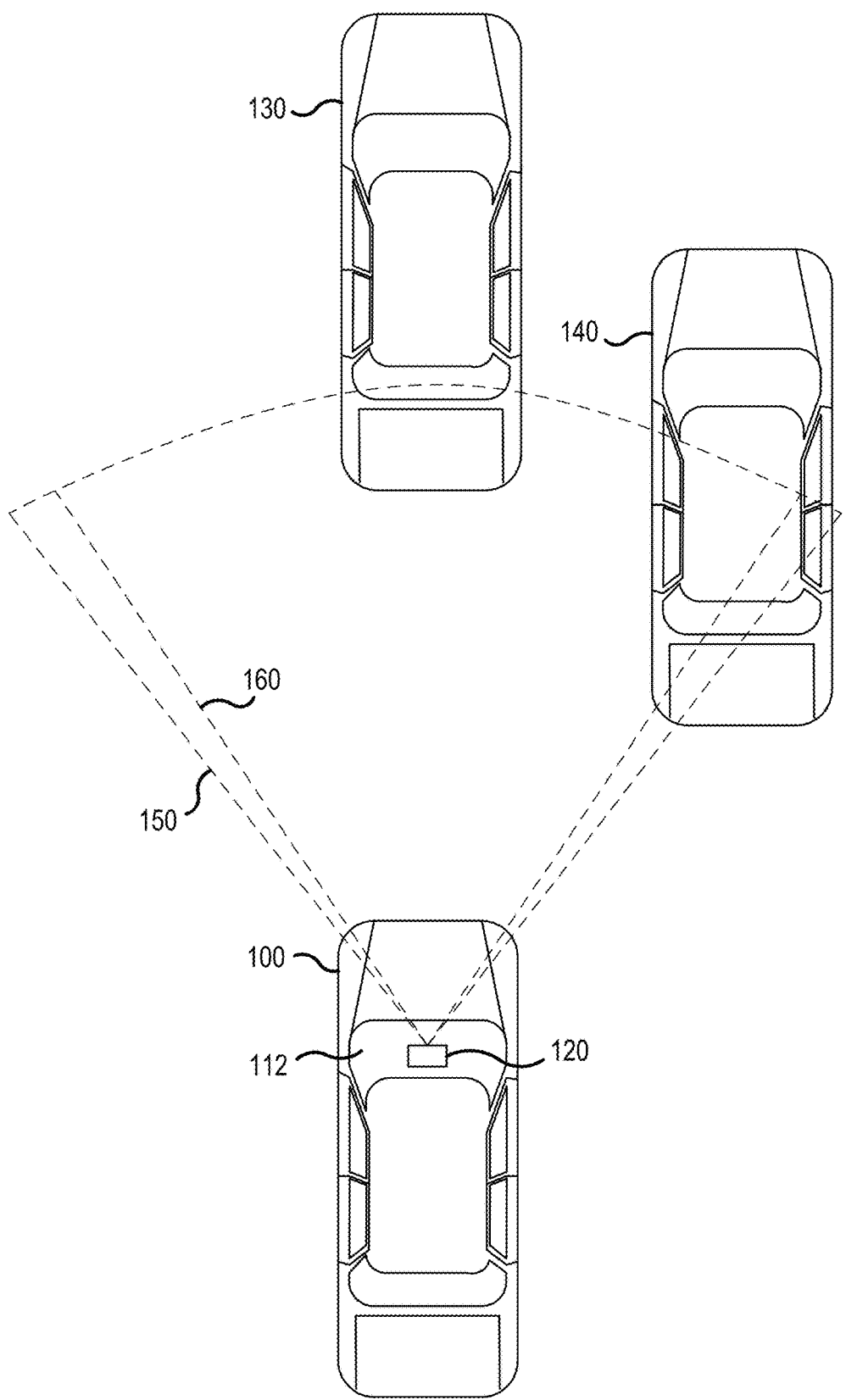
FIG. 1 is a top view of a vehicle employing an integrated radar-camera sensor behind the windshield, according to various aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (e.g., an ego-vehicle) is illustrated that includes a radar-camera sensor module 120 located in the interior compartment of the vehicle 100 behind the windshield 112. The radar-camera sensor module 120 includes a radar sensor component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar sensor component and the camera component are collocated components in a shared housing, as will be appreciated, they may be separately housed in different locations within the vehicle 100. For example, the camera may be located as shown in FIG. 1, and the radar sensor may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar sensor permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
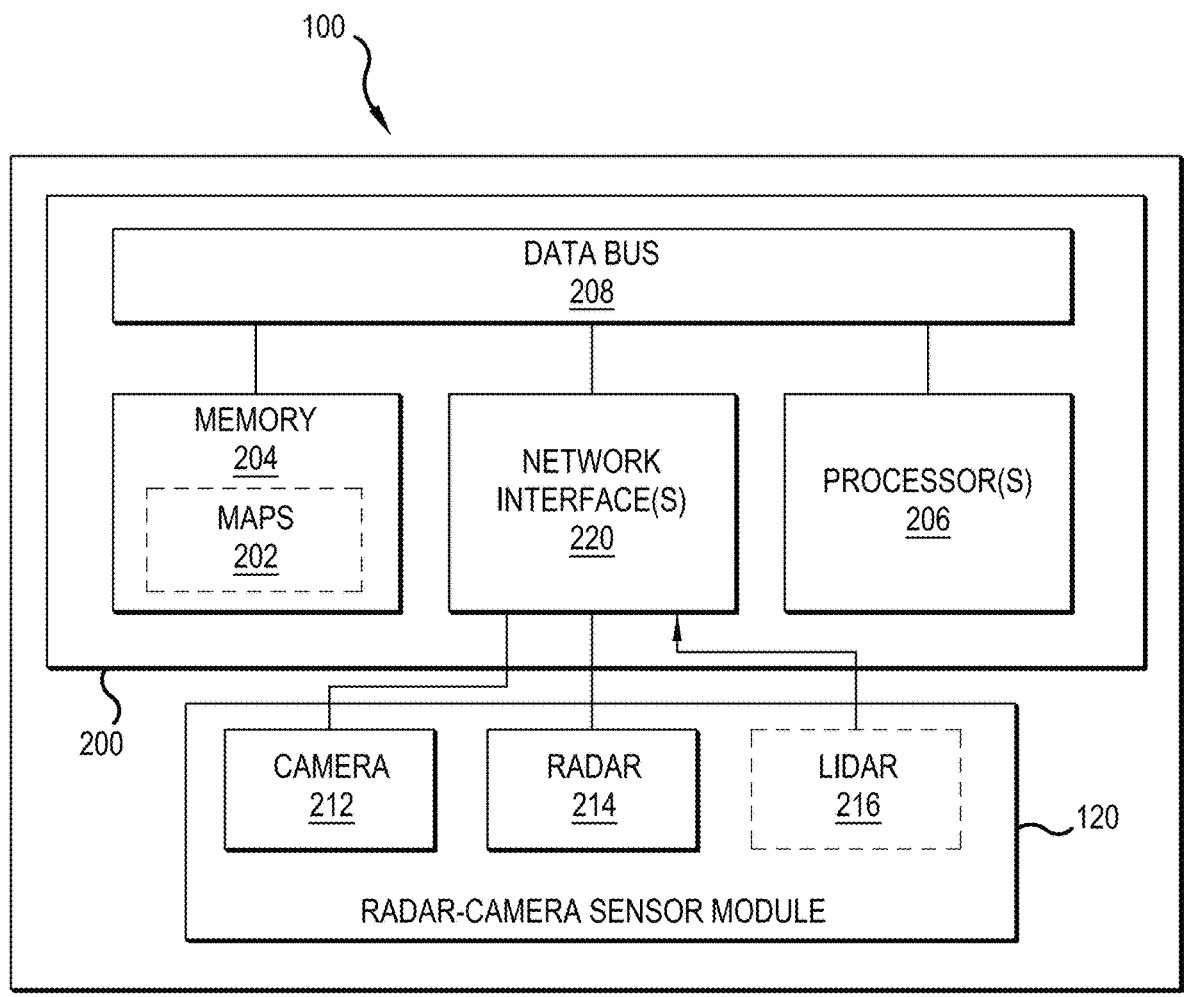
FIG. 2 illustrates an on-board computer architecture, according to various aspects of the disclosure.

FIG. 2 illustrates an on-board computer (OBC) 200 of a vehicle 100, according to various aspects. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein.

One or more radar-camera sensor modules 120 are coupled to the OBC 200 (only one is shown in FIG. 2 for simplicity). In some aspects, the radar-camera sensor module 120 includes at least one camera 212, at least one radar sensor 214, and an optional Light Detection and Ranging (LiDAR) sensor 216. The OBC 200 also includes one or more network interfaces 220 connecting the processor(s) 206, by way of the data bus 208, to the radar-camera sensor module 120, other vehicle sub-systems (not shown), and in some cases, wireless communication networks (not shown), such as wireless local area networks (WLANs), global positioning systems (GPS) networks, cellular telecommunication networks, and the like.

In an aspect, the OBC 200 may utilize the network interfaces 220 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar sensor 214 may capture radar frames of the scene within the viewing area of the radar sensor 214 (as illustrated in FIG. 1 as horizontal coverage zone 150) at some periodic rate. The periodic rates at which the camera 212 and the radar sensor 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

Figure 3:
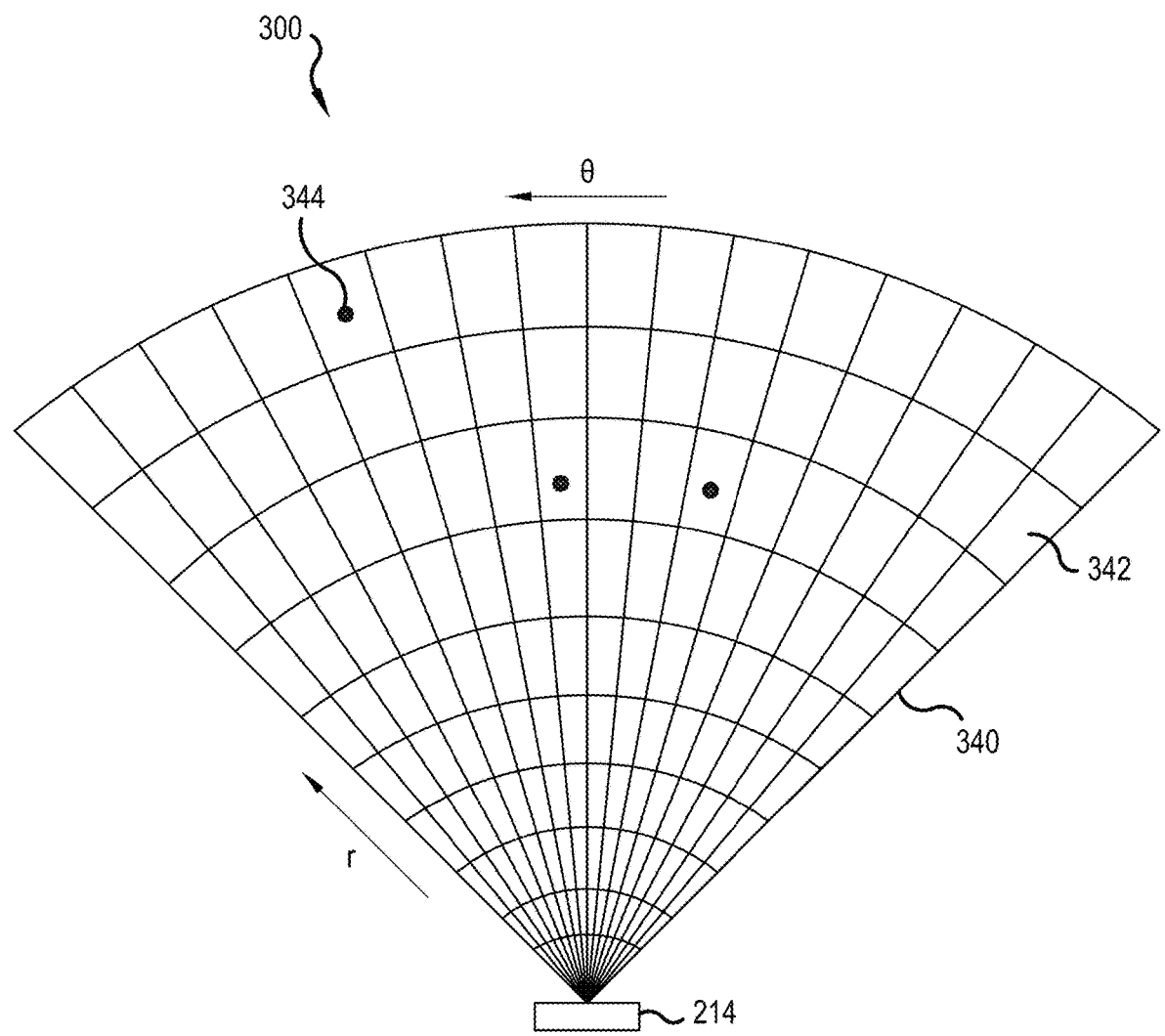
FIG. 3 is a schematic of a sensed occupancy radar grid, according to various aspects of the disclosure.

FIG. 3 illustrates a sensed occupancy radar grid 300. A transmitter (e.g., an array of transmit antennas) of the radar sensor 214 generates an electromagnetic field in the direction the transmitter is pointing (e.g., horizontal coverage zone 150). More specifically, the transmitter transmits pulses of RF waves that reflect off object(s) in the transmission path of the RF waves, such as vehicles 130 and 140 in FIG. 1. A portion of the RF waves that are reflected off the object(s) are returned to a receiver (e.g., an array of receive antennas) of the radar sensor 214, which is usually located at the same site as the transmitter of the radar sensor 214.

In an aspect, the radar sensor 214 may be an imaging radar sensor that uses beamforming to scan horizontally and vertically. Beamforming is a technique used to aim the effective direction of a radar beam by changing the delay between different transmitting antennas so that the signals add constructively in a specified direction. Thus, the radar sensor 214 may scan horizontally and vertically across the sensing area (e.g., horizontal coverage zone 150) by using a transmitter comprising an array of electronically steered antennas.

The electromagnetic field generated by the radar sensor 214 is characterized as an occupancy grid 340 having a plurality of observation cells 342. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 generate four dimensional (4D) tensors for features 344 within cells 342 of the occupancy grid 340 detected by the radar sensor 214. The generated tensors represent the range (distance from the vehicle 100 to the detected feature 344), azimuth (the horizontal distance between a feature 344 and a reference RF ray emitted by the radar sensor 214, such as the initial RF ray of a radar sweep), Doppler (indicating the speed of the detected feature 344), and elevation (vertical direction from the radar sensor 214 to the detected feature) of each detected feature 344. The processor(s) 206 then performs object detection, object classification, localization, and property estimation based on the tensors and undistorted camera frames received from the camera 212.

Figure 4:
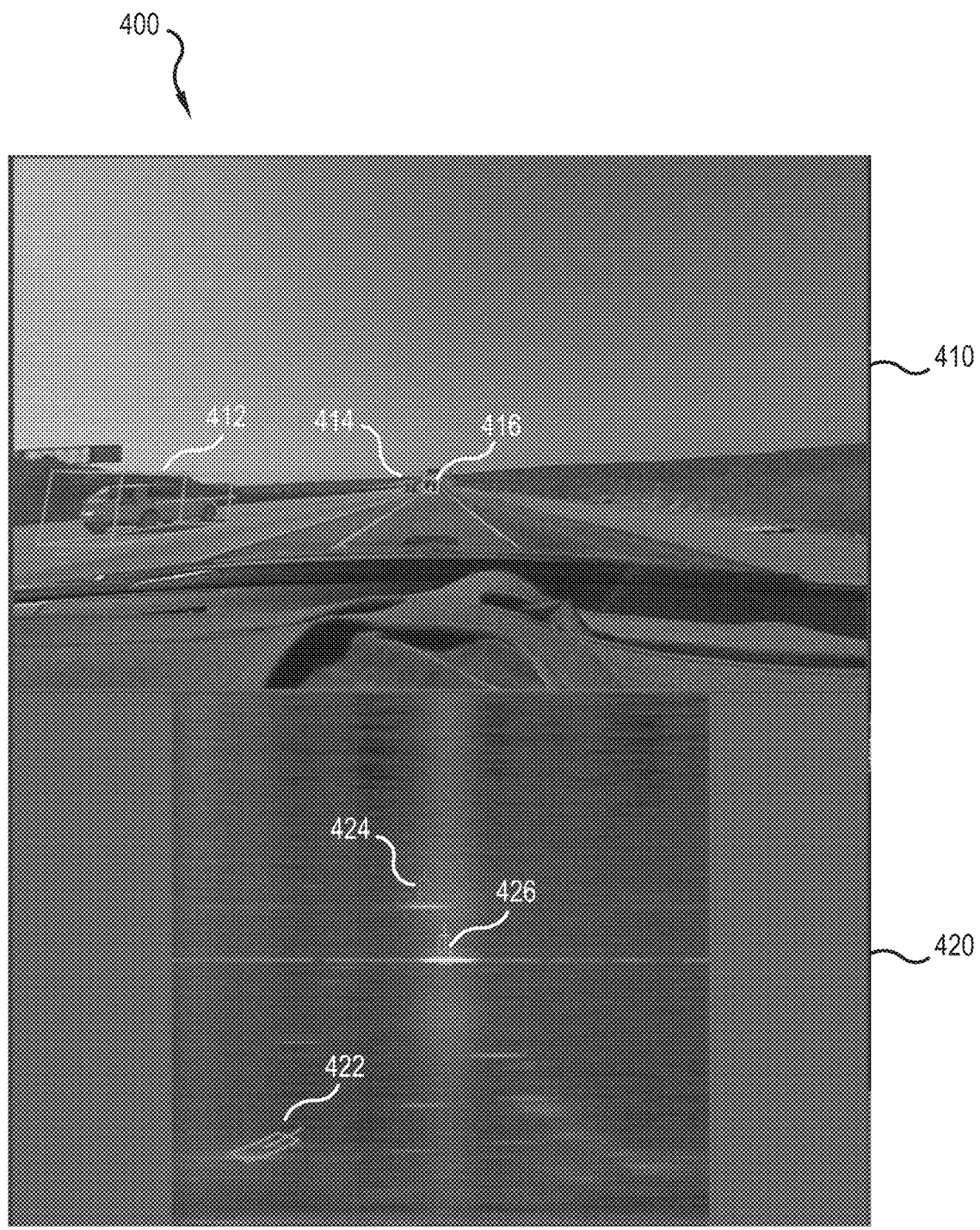
FIG. 4 illustrates a comparison between an exemplary camera frame and exemplary radar frame, according to various aspects of the disclosure.

FIG. 4 illustrates a pair 400 of a camera image 410 and a radar image 420 of the same scene. The camera image 410 may have been captured by the camera 212, and the radar image 420 may have been captured by the radar sensor 214. The camera 212 captures raw camera frames of the scene within the viewing area of the camera 212 (as illustrated in FIG. 1 as horizontal coverage zone 160). The processor(s) 206 correct any distortion in the raw camera frames to generate undistorted camera frames that are used for processing with the radar tensors. The camera image 410 is an example of an undistorted camera frame. Note that the terms "frame" and "image" are used interchangeably herein.

The radar image 420 is captured and processed as discussed above with respect to FIG. 3. The camera image 410 and the radar image 420 are then processed to identify objects within the respective images. Object detection in radar images was discussed above with respect to FIG. 3. Object detection in camera images is well-known in the art and is therefore not further described here for the sake of brevity. Any object detection methods and/or techniques may be used to detect objects in the camera images.

The results of the object detection are various attributes of the detected object(s), including bounding boxes in Cartesian x-y(-z) coordinates that tightly enclose the object(s). In the camera image 410, three objects have been detected, each surrounded by a bounding box 412, 414, and 416. In the radar image 420, the same three objects have been detected and are surrounded by bounding boxes 422, 424, and 426. As can be seen in FIG. 4, the shapes of the objects/bounding boxes 422, 424, and 426 in the radar image 420 are different sizes and shapes based on their distance from the radar sensor (e.g., radar sensor 214). For example, the bounding boxes associated with the closer objects (bounding box 422) are larger than the bounding boxes associated with farther objects (bounding boxes 424 and 426) due to reception at the radar sensor 214 of fewer reflected radio waves due to the greater distance between the radar sensor 214 and the further objects.

Once one or more objects (or none) have been identified in the camera image 410, the processor(s) 206 may use pattern-recognition and/or object recognition algorithms to classify the object(s) as road signs, traffic barrels, cars, trucks, motorcycles, bicyclists, and pedestrians. The fine pixel resolution of an image enables precise angular localization of recognized objects. Range may be estimated from stereo disparity if two cameras are used. Otherwise, a monocular system can estimate range from expected object size or displacement from the horizon. Object classification for radar images is more difficult, and often relies on correlating the object(s) detected in the radar image (e.g., radar image 420) to the object(s) detected in the corresponding (i.e., simultaneously, or nearly simultaneously, captured) camera image (e.g., camera image 410).

More specifically, the radar sensor 214 provides reasonably accurate measurements of object distance and velocity in various weather conditions. However, radar systems typically have insufficient resolution to identify features of the detected objects. The camera 212, however, may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. The heavy mathematics can now be applied to every pixel in a video/radar stream in real time due to miniature supercomputers comprised of inexpensive graphics processing units (GPUs).

Figure 5:
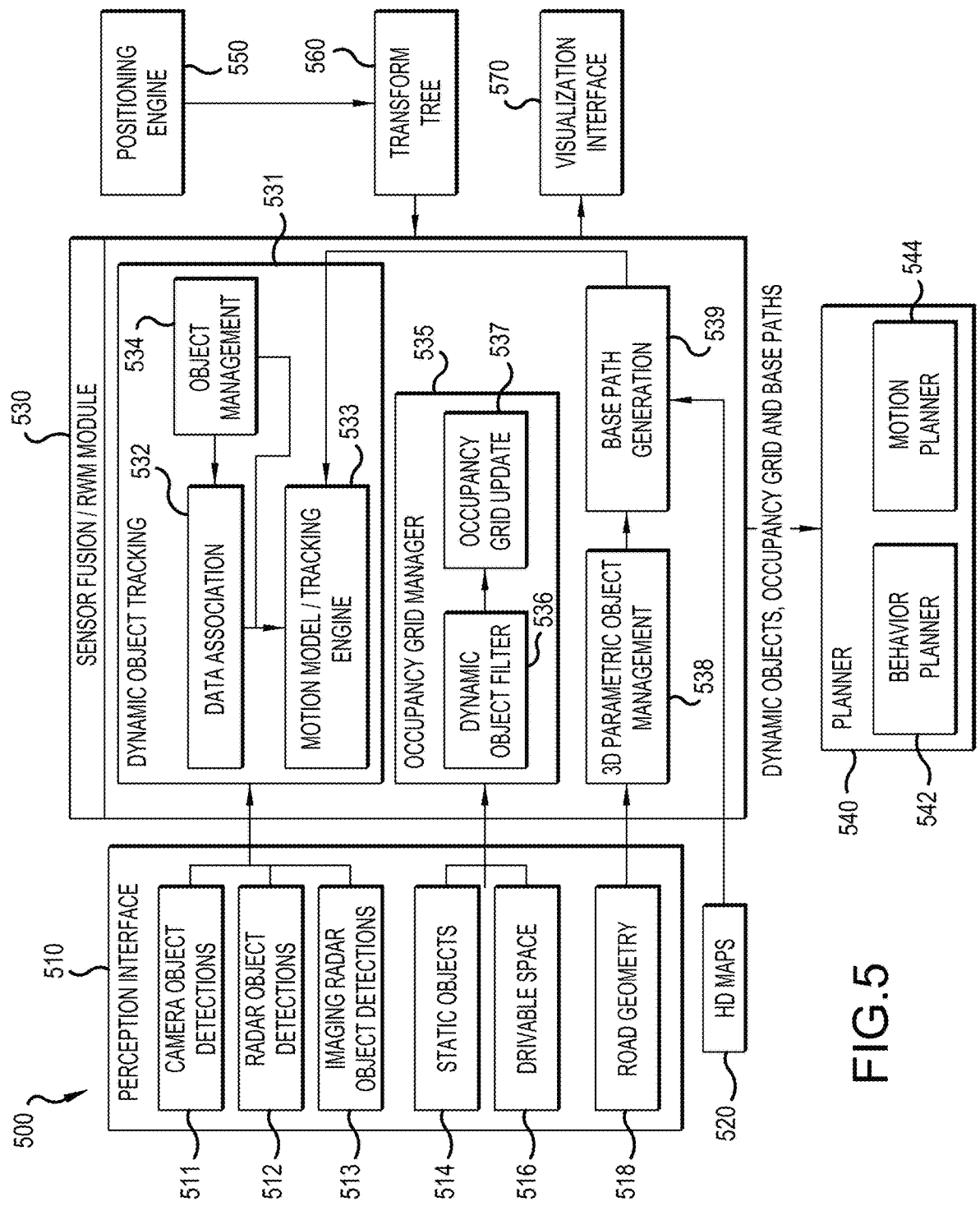
FIG. 5 illustrates an exemplary sensor fusion architecture, according to aspects of the disclosure.

FIG. 5 illustrates an exemplary sensor fusion architecture 500, according to aspects of the disclosure. In an aspect, the sensor fusion architecture 500 may be implemented by the radar-camera sensor module 120 and/or the OBC 200 of FIG. 2. A perception interface 510 of the sensor fusion architecture 500 provides inputs to a sensor fusion/real world model (RWM) module 530. In the example of FIG. 5, the perception interface 510 includes camera object detections 511 (e.g., detected based on data from the camera 212), optional radar object detections 512 (e.g., detected based on data from the optional LiDAR sensor 216), and imaging radar object detections 513 (e.g., detected based on data from the radar sensor 214). The perception interface 510 also includes information about static objects 514, drivable space 516, and road geometry 518. The information about static objects may be bounding box information, the same as for vehicles. Information about drivable space may include a per pixel label indicating whether that pixel is drivable or not. The information about road geometry may be a spline representation of the lane boundaries.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target vehicle(s) in previous camera/radar frames are matched to currently detected vehicle(s) and associates them with each other across the camera/radar frames. The dynamic object tracking module 531 receives the camera object detections 511, optional radar object detections 512, and imaging radar object detections 513 from the perception interface 510 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and the occupancy grid update module 537 updates the occupancy grid information (e.g., which grid boxes are occupied and which are open). Finally, the sensor fusion/RWM module 530 includes a 3D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby vehicles are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100 of FIGS. 1 and 2) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc., not shown) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no vehicles in it before the planner module 540 directs the vehicle to change lanes as instructed.

Figure 6:
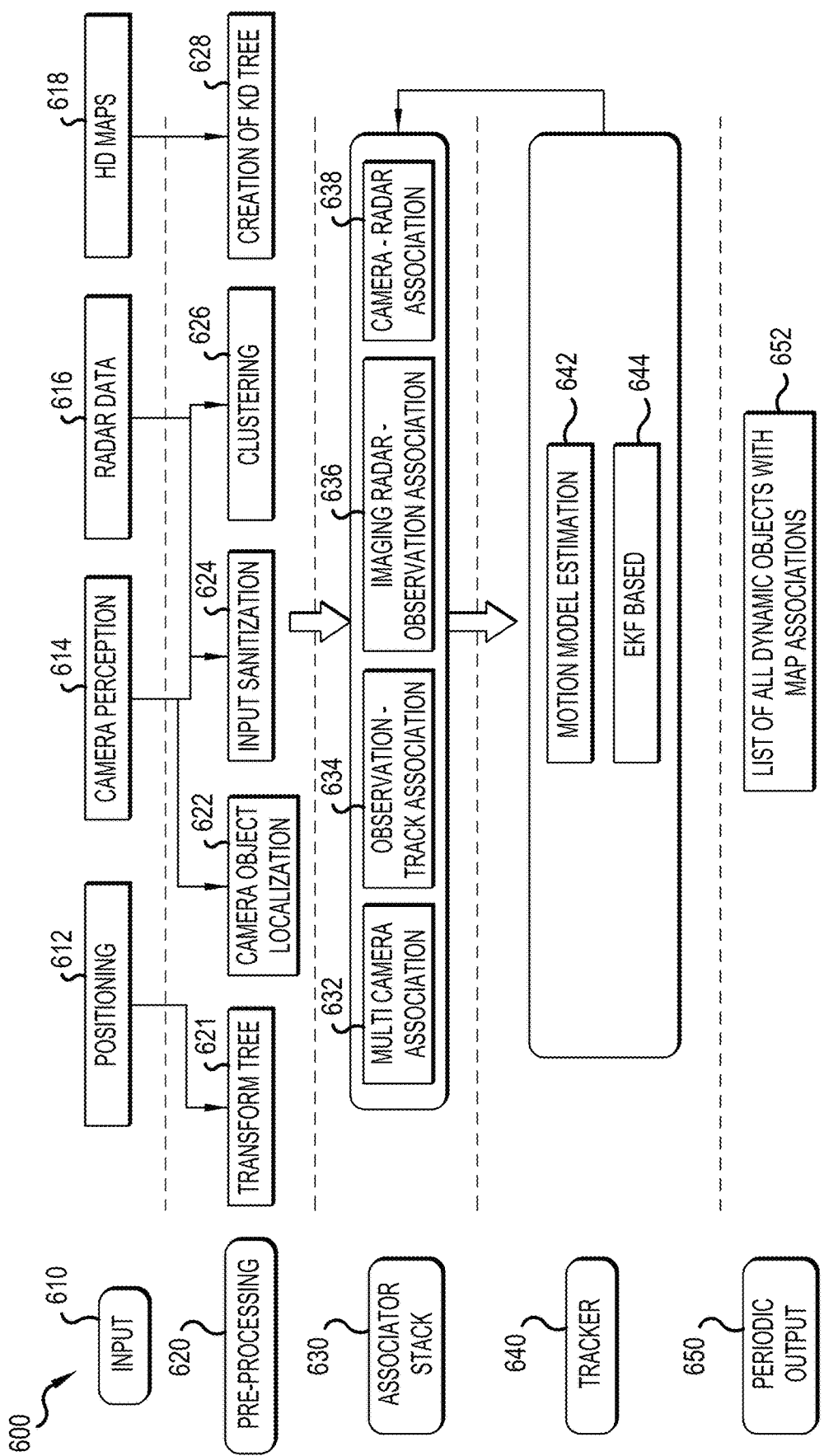
FIG. 6 illustrates an exemplary object tracking architecture, according to aspects of the disclosure.

FIG. 6 illustrates an exemplary object tracking architecture 600, according to aspects of the disclosure. In an aspect, the object tracking architecture 600 may be implemented by the radar-camera sensor module 120 and/or the OBC 200 of FIG. 2, and more specifically, the dynamic object tracking module 531 of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar sensor 214), and HD maps 618 (e.g., HD maps 520 of FIG. 5).

At a pre-processing stage 620, the object tracking architecture 600 creates a transform tree 621 (a binary tree representation of multiple coordinate frames as nodes, and links storing the transformation matrix to move from one coordinate frame to another) from the positioning information 612. The pre-processing stage 620 performs camera object localization 622, input sanitization 624, and clustering 626 operations on the camera perception information 614 and radar data 616. The pre-processing stage 620 uses the HD maps 618 for creation of a k-D tree 628 (a space-partitioning data structure for organizing points in a k-dimensional space).

At an associator stack stage 630, the object tracking architecture 600 generates multi camera associations 632, observation track associations 634, imaging radar observation associations 636, and camera radar associations 638. At a tracker stage 640, the object tracking architecture 600 performs motion model estimation 642 and an extended Kalman filter (EKF) based 644 solution (discussed further below). Finally, at a periodic output stage 650, the object tracking architecture 600 outputs a list of all dynamic objects with respective map associations 652. This information is then fed to the planner module 540 in FIG. 5.

Conventional algorithms for lane marker detection (LMD) using a monocular camera include the following steps: (1) extract and cluster line segments; (2) fit the clustered lines to a geometric model; and (3) select multiple lanes using heuristic approaches. Unfortunately, with conventional LMD algorithms, an error from each step is sequentially propagated to the next step. This can lead to inaccurate line segments and incorrect clustering among others. Also, the heuristic approaches can produce many false positive LMD results. Further, the current algorithms do not estimate both lane markers (LMs) and raised pavement markers (RPMs). Deep neural network (DNN)—based LIVID methods can provide accurate multiple lane detection. However, they do not work in real time.

Figure 7:
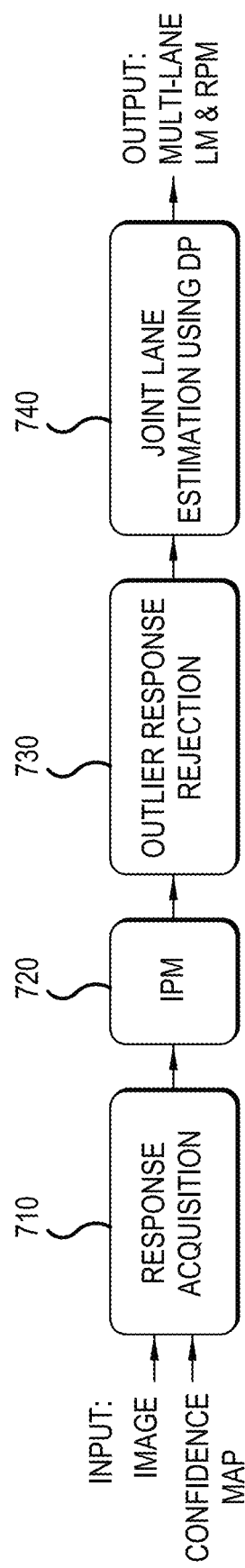
FIG. 7 illustrates a block diagram view of an example flow of proposed technique(s) to estimate multiple lane boundaries, according to aspects of the disclosure.

To address some or all issues of conventional algorithms, the present disclosure provides techniques for estimating multiple lane boundaries through simultaneous detection of LMs and RPMs in real time. FIG. 7 illustrates a block diagram of an example flow of the proposed technique/process, e.g., performed by a system on an ego-vehicle. The system may comprise any combination of the architectures of FIGS. 2, 5 and 6. The example process includes the following stages: response acquisition stage 710, inverse perspective mapping (IPM) stage 720, outlier response rejection stage 730, and joint lane estimation stage 740. Inputs to the process include one or more images and one or more confidence maps.

Each image can be a camera frame captured by a camera sensor such as the camera sensor 212. There can be one or more camera sensors. The camera frame can be an image from a monocular camera. In an aspect, the system may perform the process continuously, e.g., to process sequential camera frames. In the system, knowledge gained from processing prior camera frames are used to process subsequent frames. For example, confidence maps, which are also inputs to the process, may be derived from processing of prior camera frames. The confidence maps increase the robustness of the proposed process.

Figure 8:
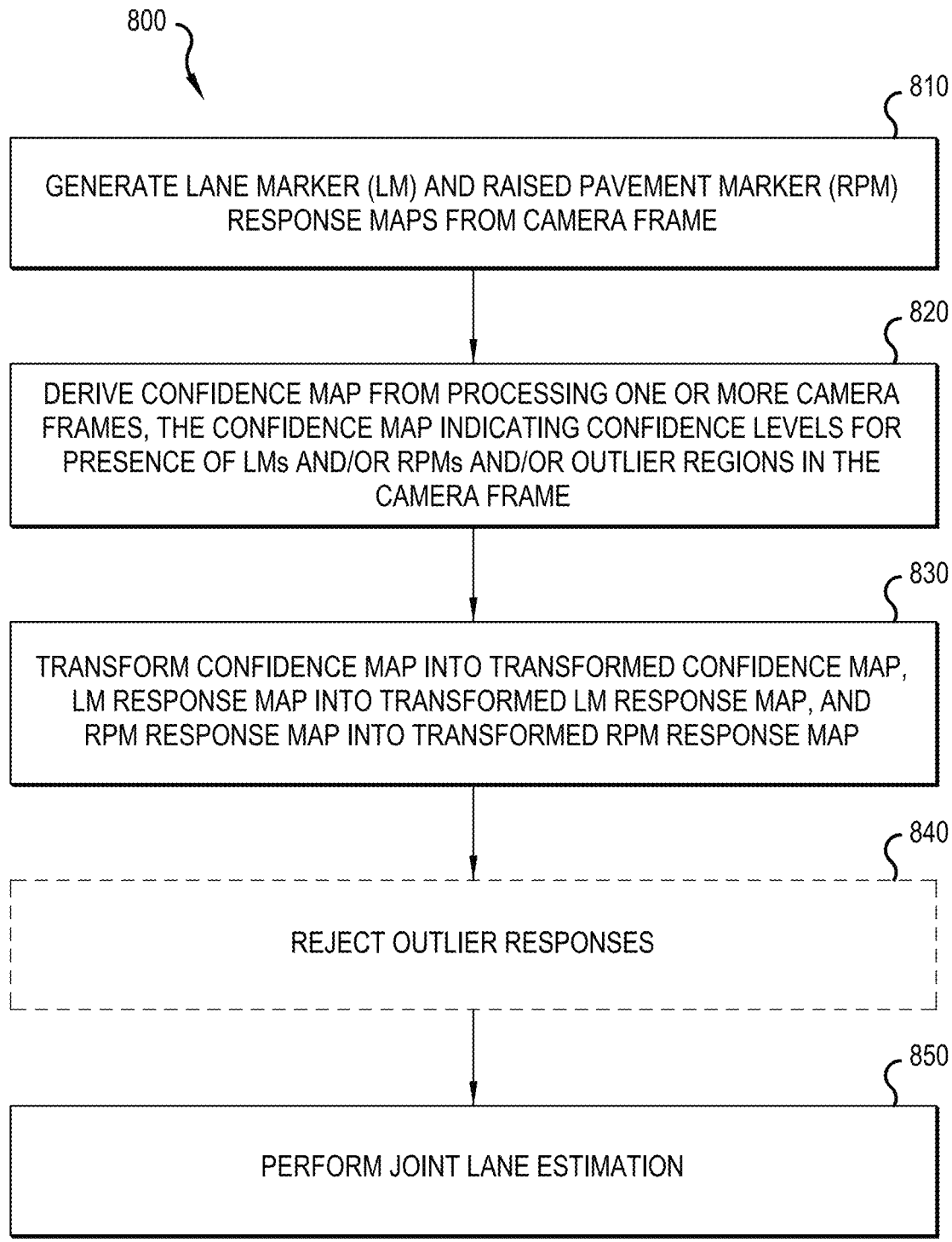
FIG. 8 illustrates a flow chart of an example method for estimating lane boundaries, according to aspects of the disclosure.

FIG. 8 illustrates a flow chart of an example method 800 performed by the system to estimate lane boundaries in a camera frame captured by a camera sensor. For ease of description, a single camera frame captured by a single camera sensor is assumed in FIG. 8. In block 810, the system may generate an LM response map and an RPM response map from the camera frame. The LM response map may indicate presence of one or more LMs within the camera frame. Similarly, the RPM response map may indicate presence of one or more RPMs within the camera frame. Block 810 may correspond to the response acquisition stage 710.

To generate the LM and RPM response maps, the RBG image of the camera frame may first be converted to a luminance (or grayscale) map. The LM and RPM response maps may then be generated from the luminance map by applying filters. For example, a one-dimensional (1-D) filter (e.g., 1-D horizontal filter with horizontal spacing parameter w) may be applied to the luminance map to generate the LM response map. The 1-D horizontal filter may be expressed as follows:

$$f(x,y)=2I(x,y)-(I(x-w,y)+(x+w,y))-|I(x-w,y)-I(x+w,y)|,$$

where f (x, y) represents an output of the 1-D horizontal filter pixel at coordinates (x, y) of the luminance map, I(x, y) represents luminance value, i.e., a brightness value, of the pixel x,y, in the luminance map and w is a user controllable horizontal spacing parameter. The outputs f (x, y) can be captured in the LM response map.

When generating the RPM response map a 2-D filter may be applied. In an aspect, applying a 2-D filter may comprise applying two 1-D filters. For example, the same 1-D horizontal filter to generate the LM response may be applied to the luminance map. But in addition, a 1-D vertical filter (with vertical spacing parameter h) may also be applied. The 1-D vertical filter may be expressed as follows:

$$g(x,y)=2I(x,y)-(I(x,y-h)+(x,y+h))-|I(x,y-h)-I(x,y+h)|,$$

where g(x, y) represents an output of the 1-D vertical filter pixel at coordinates (x, y) of the luminance map, I(x, y) represents luminance value of the pixel x,y, in the luminance map and h is a user controllable vertical spacing parameter. The results of filtering through both the 1-D horizontal and vertical filters may be combined in the RPM response map. One combining example may be expressed as follows:

$$h(x,y)=0.5(f(x,y)+g(x,y)).$$

The outputs h(x, y) can be captured in the RPM response map. The combining factor 0.5 is merely an example, and can be user settable.

It should be noted that 1-D "horizontal" and "vertical" filtering are terms of convenience and are not necessarily meant to indicate absolute filtering orientation. They may be replaced with 1-D first orientation filter and 1-D second orientation filtering. Also, although preferred, the orientations of the two 1-D filters need not be completely orthogonal (right angles) to each other. It may be sufficient that their orientations are not in line (0° or)180°.

It should also be noted that 2-D filter may be applied to generate the LM response map. Lane markers may be viewed as shapes that are painted on a road surface. That is, the lane markers (or more generally painted markers) typically have zero (or insignificant) height relative to the surface of the road. When the shapes of the lane markers are something other than a line (e.g., circles, ellipses, etc.), then applying the 2-D filter may be appropriate to achieve a desired detection accuracy. But in most instances, lane markers are painted as line segments. In such instances, 1-D filtering may be sufficient to generate the LM response map with reasonable accuracy in LM detection.

Conversely, 1-D filtering may be applied to generate the RPM response map. But in most instances, RPMs are typically objects (e.g., reflectors, grooves, etc.) that are incorporated into the road, and thus can have non-zero height with respect to the road. The height can be positive (i.e., above the road surface) or negative (below the road surface). In such situations, 2-D filtering may be preferred to achieve the desired accuracy in detection of the RPMs.

Figure 9:
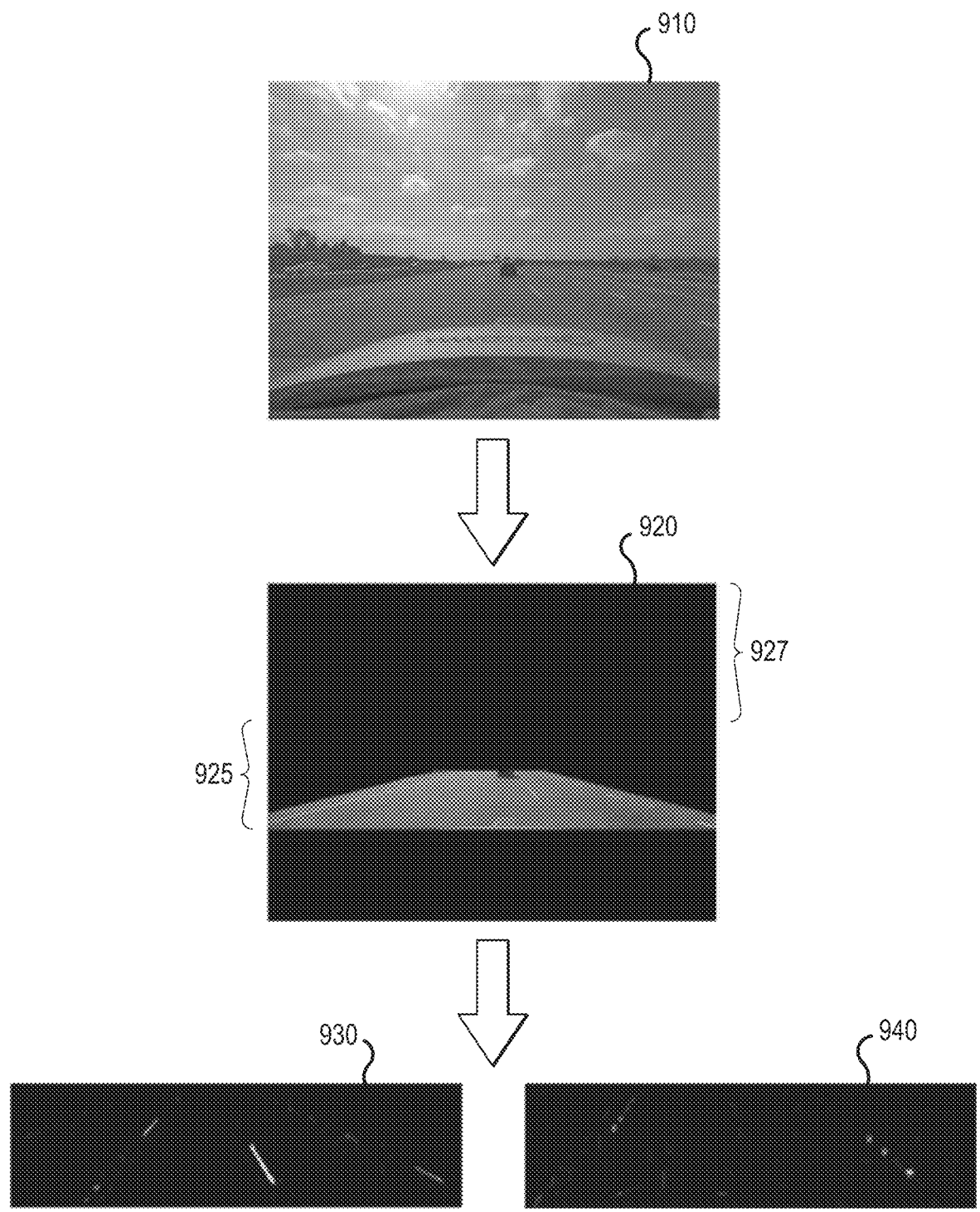
FIG. 9 illustrates exemplary images showing a response acquisition process, according to the techniques described herein.

FIG. 9 exemplifies the response acquisition stage 710 of FIG. 7 and block 810 of FIG. 8. FIG. 9 shows an example of a camera frame (original image) 910, an image of the converted luminance map 920, example image of a corresponding LM response map 930, and an image of a corresponding RPM response map 940. In an aspect, a region of interest (e.g., a road region) 925 may be identified and converted in the luminance map image 920. The LM and RPM responses need not be generated for regions that are not of interest such as region 927, which corresponds to the view of the horizon in the image 910.

Referring back to FIG. 8, in block 820, the system may derive the confidence map. As described above, the confidence map, which may be used to process the camera frame in other blocks of FIG. 8, may be a result of from processing prior camera frames. The confidence map, derived from prior information, may indicate confidence levels for presence of LMs and/or RPMs and/or outlier regions in the camera frame.

Figure 10:
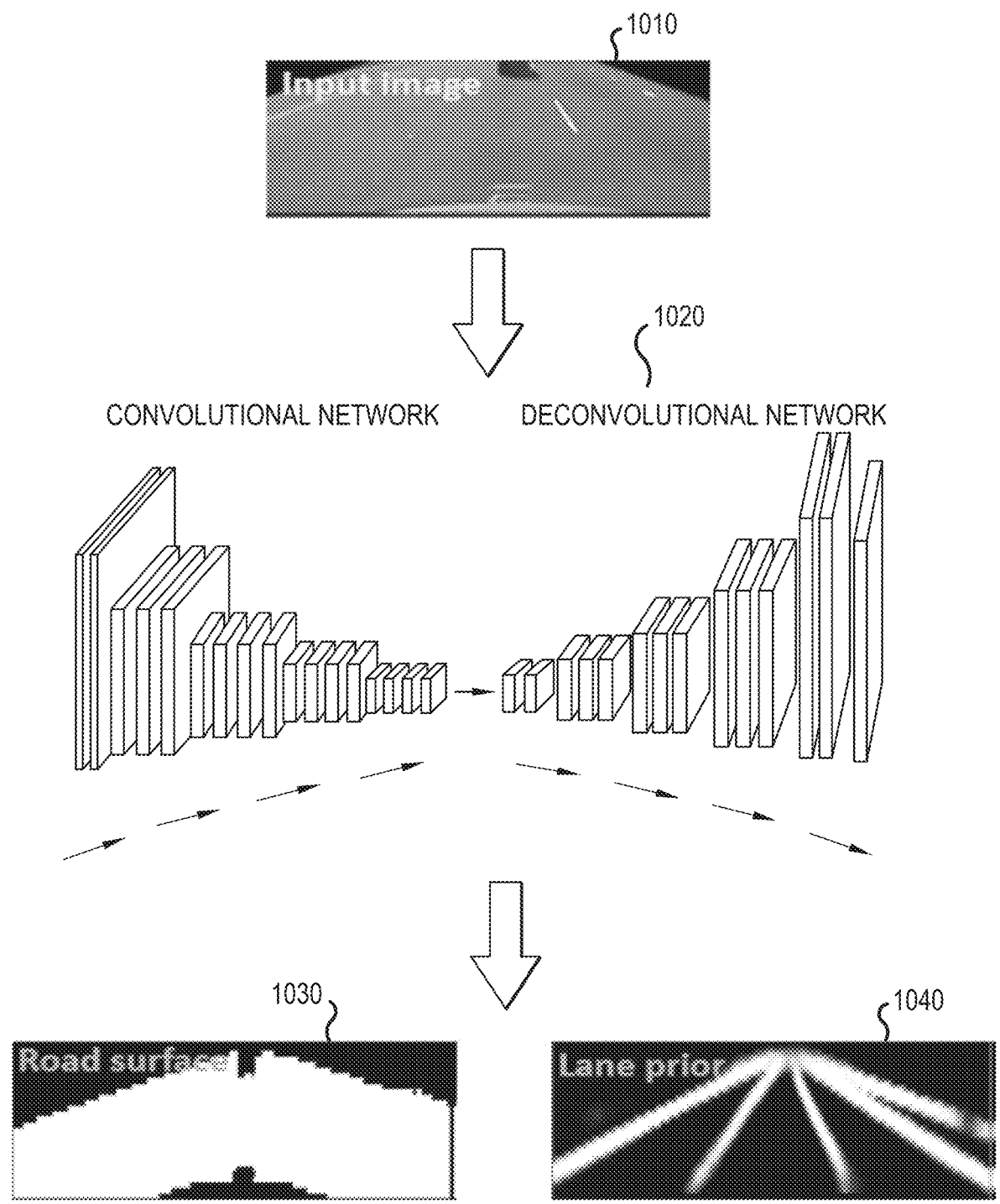
FIG. 10 illustrates exemplary images showing a process to derive a confidence map using a neural network, according to the techniques described herein.

The confidence map may be derived in a variety of ways. In an aspect, the confidence map can be derived from processing the one or more prior camera frames through a deep neural network (DNN). FIG. 10 illustrates an example of a DNN process to derive the confidence map. FIG. 10 shows an input image 1010 (e.g., prior camera frame) processed by a DNN 1020 to output a prior road surface map 1030 corresponding to road surface region and prior lane information 1040. In this instance, the confidence map can be a map that combines the prior road surface map 1030 (showing a region of road surface of the input image) and the prior lane information 1040 (identifying lanes).

Figure 11:
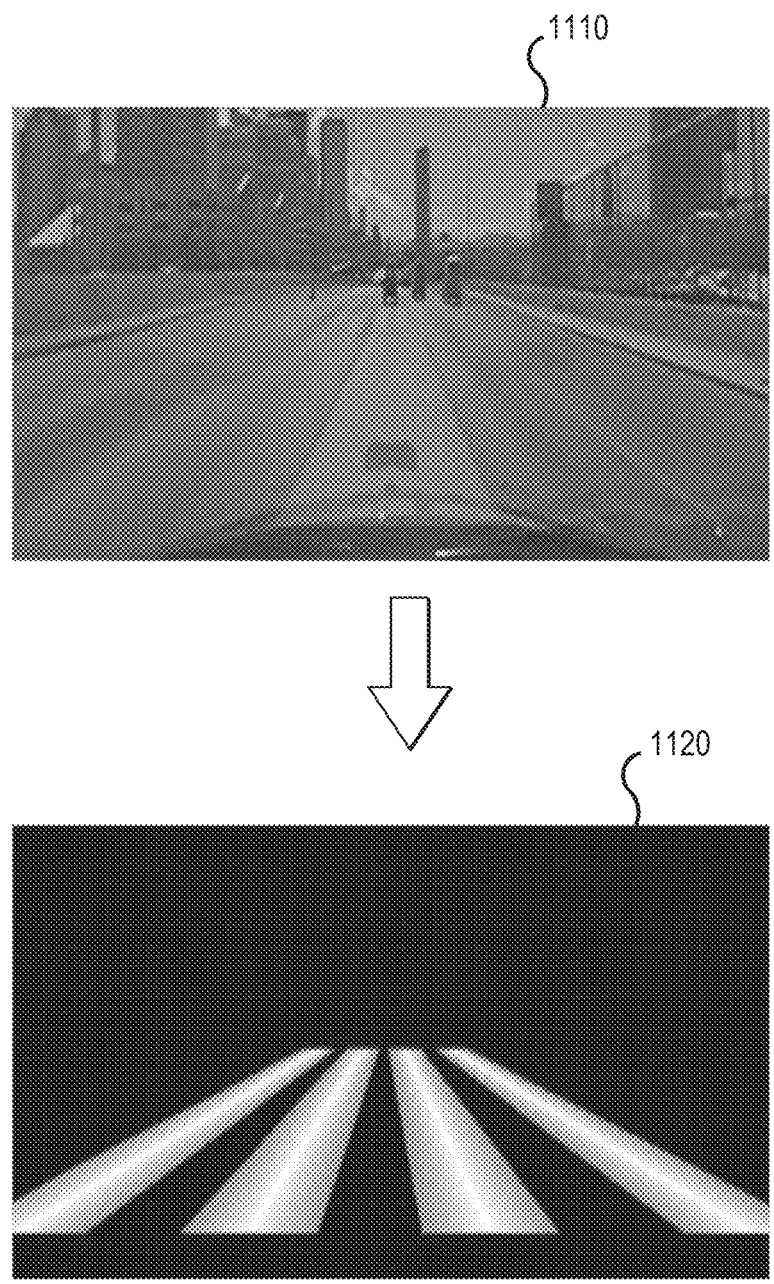
FIG. 11 illustrates exemplary images showing a process to derive a confidence map using a lane tracker, according to the techniques described herein.

In another aspect, the confidence map may be derived through a lane tracker process as illustrated in FIG. 11. FIG. 11 shows a lane tracking result 1110 of tracking lanes (e.g., using computer vision) in an input image (e.g., prior camera frame), and confidence map 1120 resulting from the processing of the lane tracking result. Of course, any number of—i.e., one or more—prior frames may be used to derive the confidence map through the lane tracker process for the current camera frame.

Figure 12:
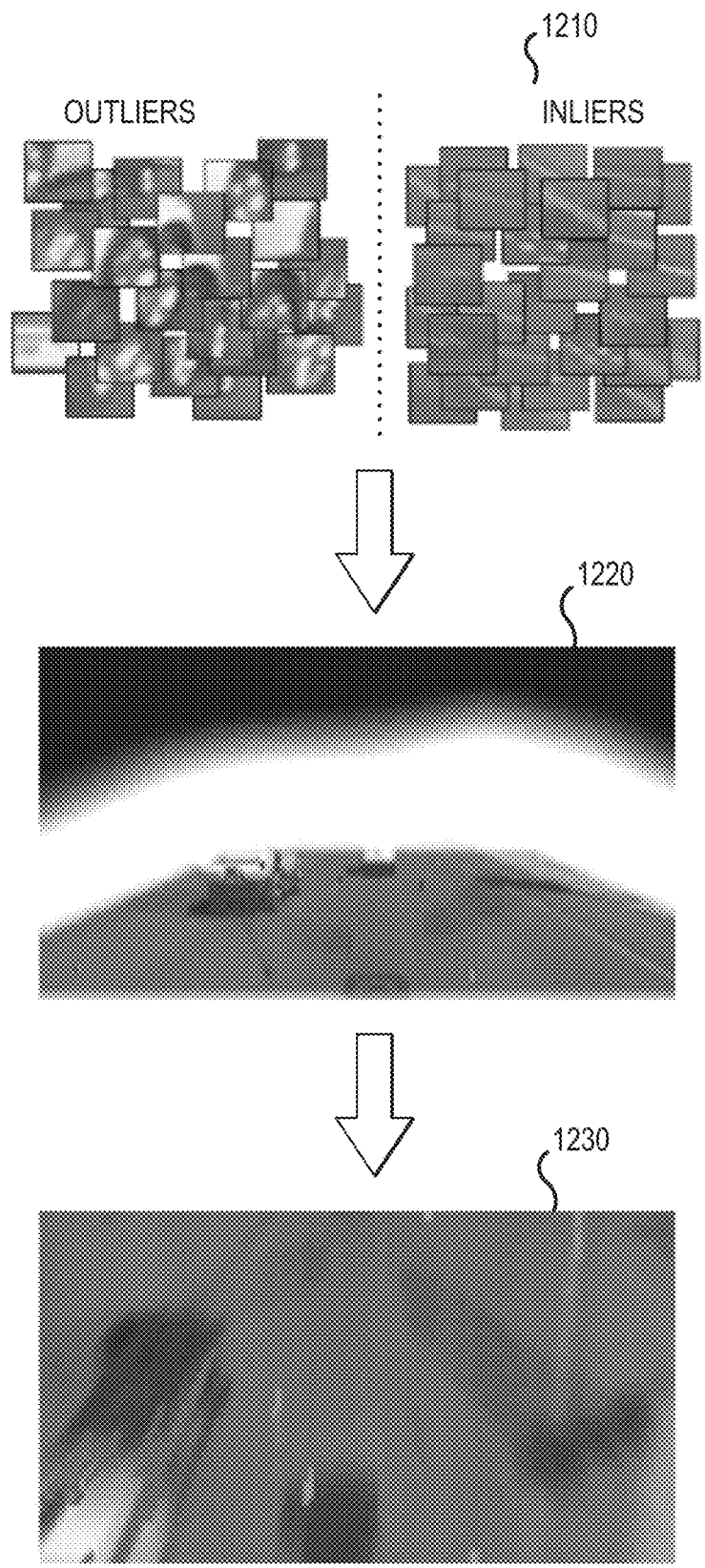
FIG. 12 illustrates exemplary images showing a process to derive a confidence map using computer vision, according to the techniques described herein.

In a further aspect, the confidence map may be derived through using computer vision as illustrated in FIG. 12. FIG. 12 shows training a classifier on image patches 1210 to detect inlier points 1210. The classifier can also be trained to detect outlier points 1220, which are points that are neither LMs nor RPMs, in a prior image, and to detect outlier regions 1230 by clustering the outlier points. The classifier may be trained through a support vector machine (SVM) training algorithm with histogram of oriented gradients (HOG) features. Again, any number of prior frames may be used. In addition, any of the described ways—e.g., DNN, lane tracker process, computer vision, etc.—may be combined with any one or more of the other described ways to derive the confidence map.

Referring back to FIG. 8, in block 830, the system may transform the confidence map, the LM response map, and the RPM response map respectively into a transformed confidence map, a transformed LM response map, and a transformed RPM response map. The transformed maps may be such that they have a common spatial domain, e.g., the same bird's eye view. Block 830 may correspond to the IPM stage 720 of FIG. 7. More generally, stage 720 may be referred to as a common spatial transformation stage.

Figure 13:
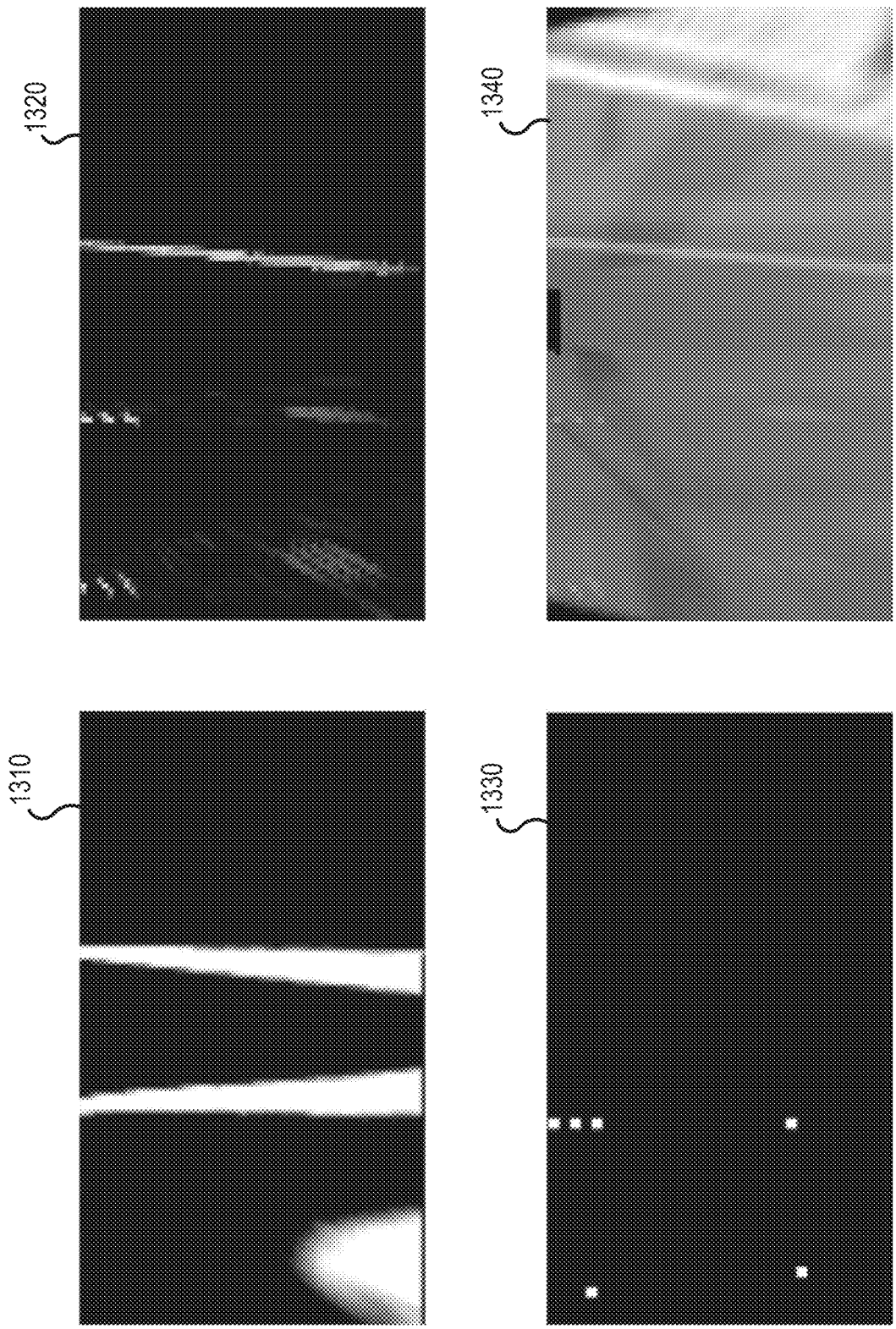
FIG. 13 illustrates examples of transformed confidence map, a lane marker response map, and a raised pavement marker response map, according to the techniques described herein.

FIG. 13 illustrates examples of the transformed confidence map 1310, the transformed LM response map 1320, and the transformed RPM response map 1330. A transformed luminance image 1340 is also included for completeness and comparison. In an aspect, the transformed confidence map 1310 may be generated by applying an inverse perspective mapping (IPM) to the confidence map. IPM allows for perspective effect to be removed from an image by homogeneously redistributing the information content of the image plane into a new two-dimensional domain. That is, a bird's eye view can be generated. The IPM may also be applied to the LM response map to generate the transformed LM response map 1320.

Generating the transformed RPM response map 1330 may be a more involved process than generating either the transformed confidence map 1310 or the transformed LM response map 1320. When generating the transformed RPM response map 1330, RPM candidate points may be extracted from the RPM response map. There can be multiple ways to extract the RPM candidate points. For example, the RPM candidate points can be extracted from processing the RPM response map through an SVM classifier with HOG feature descriptors.

Figure 14:
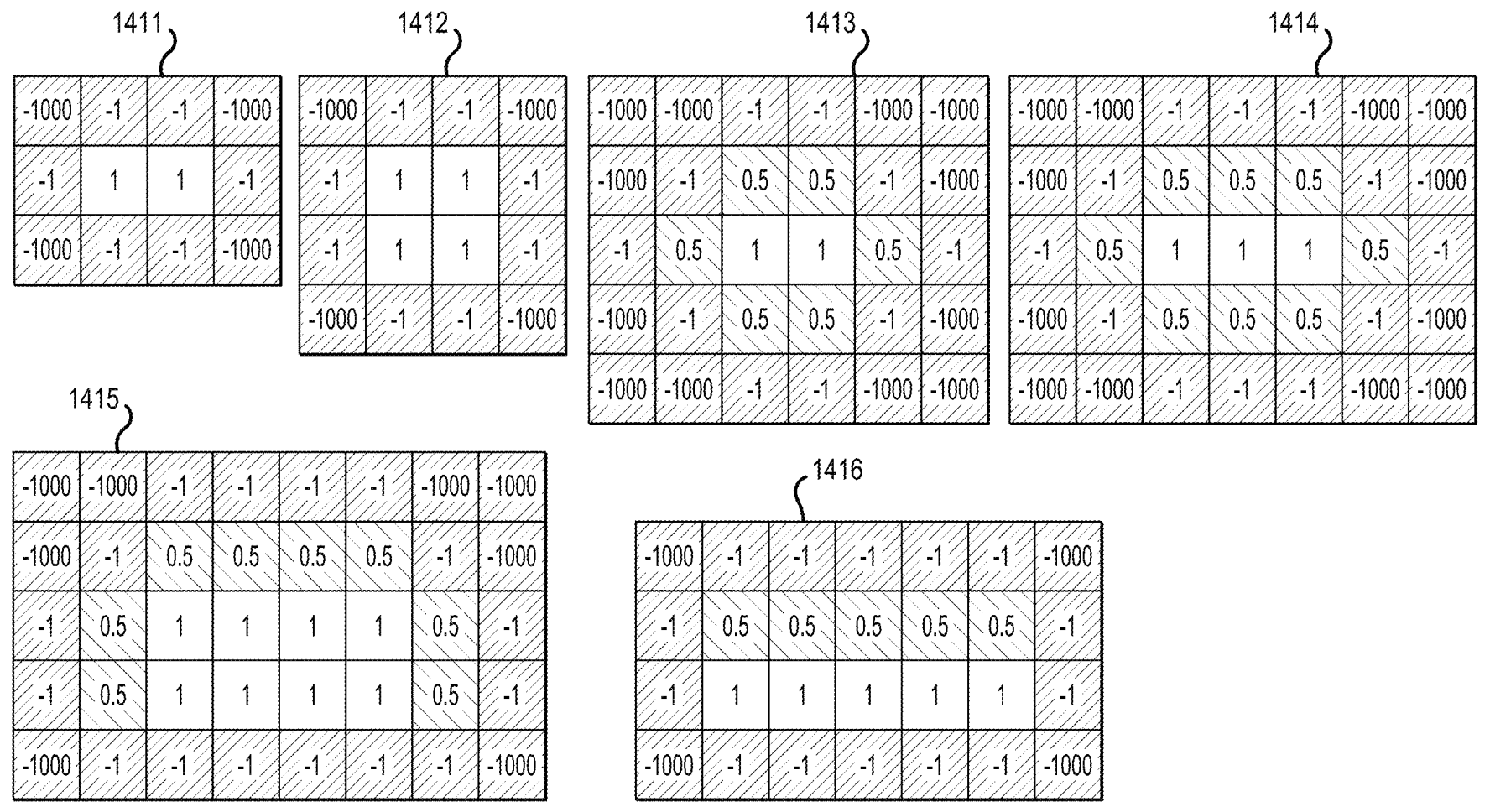

As another example, the RPM candidate points can be extracted through matching the RPM response map with one or more RPM templates. FIG. 14 illustrates some example images of the RPM templates 1411-1416. The reason for the different templates is that in an image, the shape of the RPMs is generally an ellipse, but their sizes vary depending on how far away the pixel is from the vehicle. Therefore, different elliptical templates are used. For example, template 1411 may be better suited to match with an RPM that is relatively far away while template 1415 may be better suited to match with an RPM that is relatively near. The template matching can be performed by computing zero-mean normalized cross-correlation (ZNCC) of two image patches. After template matching, if one of the ZNCC matching is over a threshold (a user-defined parameter, e.g., 0.8), then the pixel(s) of the RPM response map may be regarded as a detected RPM.

After the RPM candidate points are extracted, the coordinates of the extracted RPM candidate points may be transformed by applying IPM to corresponding coordinates of the RPM response map. The transformed coordinates may then be assigned an RPM detection value (e.g., a high value) to indicate detection of the RPM at the transformed coordinates.

Referring back to FIG. 8, in block 840, the system may reject outlier LM and/or RPM responses. Block 840 may correspond to the outlier response rejection stage 730 of FIG. 7. Block 840 is dashed to indicate that the outlier response rejection may be optional. In an aspect, the confidence map may be used to separate reliable regions from unreliable regions. Then any LM and/or RPM responses detected within the unreliable regions can be rejected.

Figure 15:
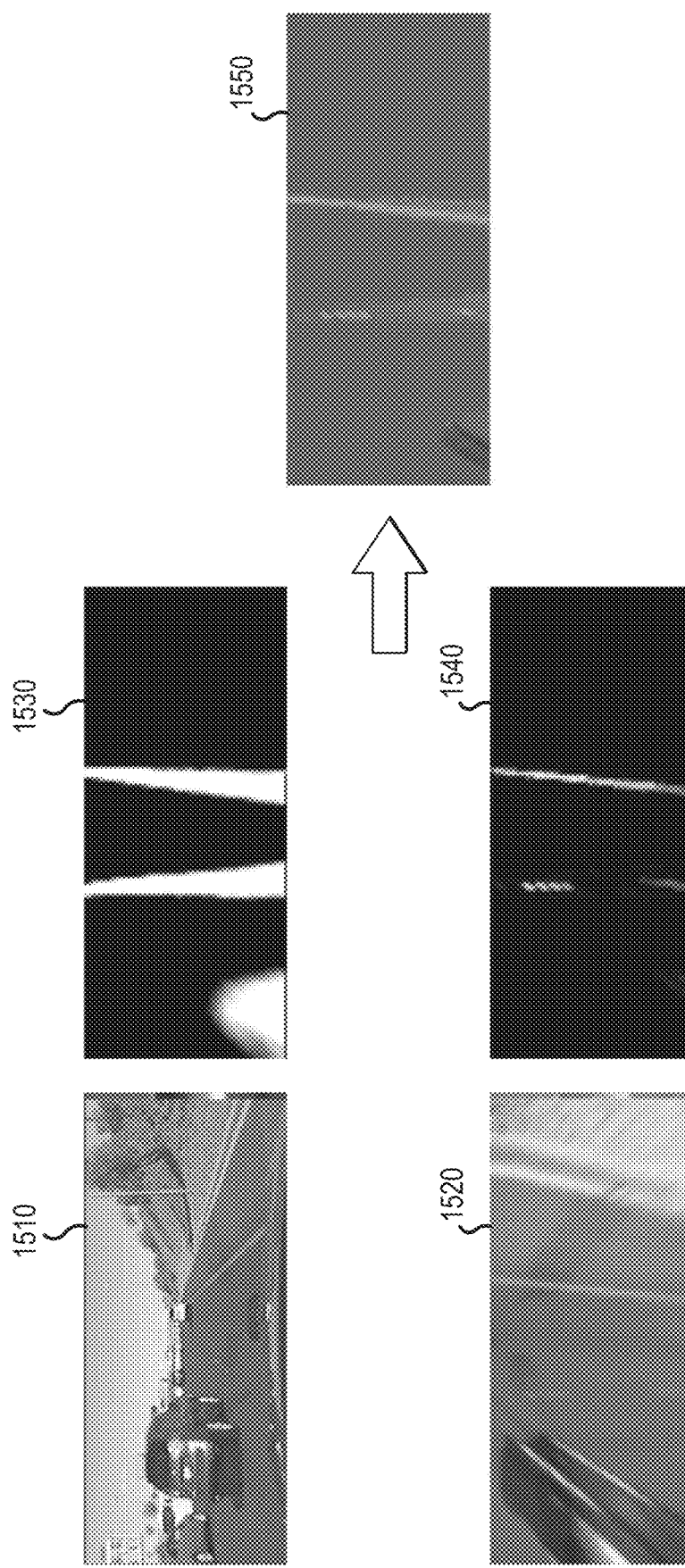
FIG. 15 illustrates an example of rejecting unreliable responses, according to the techniques described herein.

FIG. 15 illustrates an example of rejecting unreliable LM responses, i.e., rejecting outlier LM responses. FIG. 15 shows a transformed confidence map 1530 and a transformed LM response map 1540. The input camera frame 1510 and the corresponding transformed luminance map 1520 are included for comparison. That is, 1520 represents the IPM transformed grayscale image. In the transformed confidence map 1530, the dark areas indicate the unreliable regions. These are regions that are predicted to have neither the LMs nor the RPMs based on processing of the prior camera frames. On the other hand, the light areas are reliable regions, i.e., regions in which LMs and/or the RPMs are likely to be detected. As seen in 1550, only the responses within the reliable regions remain—the responses in the unreliable regions are rejected. In effect, the transformed confidence map 1530 may be used to mask the transformed LM response map 140.

The reliable and unreliable regions of the transformed confidence map may be more generalized as LM confidence regions in which each LM confidence region has an associated LM confidence level. The LM confidence level may indicate a probability of at least one LM will be within the associated confidence region. In an aspect, the unreliable regions may be those regions whose associated LM confidence level is less than an LM confidence threshold. Thus, LM outliers may be the LMs within the LM response map corresponding to the LM confidence region of the transformed confidence map whose associated confidence level is less than the LM confidence threshold. Conversely, the reliable regions may be those LM confidence regions whose associated LM confidence levels are at or above the LM confidence threshold.

While not specifically illustrated, outlier RPM responses may be rejected in a similar manner. That is, the regions of the transformed confidence map may have associated RPM confidence levels indicating probabilities of at least one RPM will be within each associated RPM confidence region. The unreliable regions may also be those RPM confidence regions whose associated RPM confidence level is less than an RPM confidence threshold. That is, RPM outliers may be the RPMs within the RPM response map corresponding to the RPM confidence region of the transformed confidence map whose associated RPM confidence level is less than the RPM confidence threshold. Conversely, the reliable regions may be those RPM confidence regions whose associated confidence levels are at or above the RPM confidence threshold.

While a same transformed confidence map may be used to reject the LM and RPM outliers, it is nonetheless contemplated that separate transformed confidence maps may be used. That is, transformed LM and RPM confidence maps may be separately generated with LM and RPM confidence regions, respectively. Also, even if the same transformed confidence map is used to reject the LM and RPM outliers, the LM and RPM confidence regions need not coincide exactly. That is, at least one LM confidence region and at least one RPM confidence region may be different. Of course, it is contemplated that there can be overlap at least in part. Moreover, the LM and RPM confidence thresholds may be independently set, i.e., need not be equal to each other. However, it may be assumed that a same transformed confidence map with same confidence regions will be used in further description unless specifically stated otherwise.

Also, while the description above provides using transformed maps (e.g., transformed LM response map, transformed RPM response map, transformed confidence map, etc.) when rejecting the LM and/or RPM outliers, this is not necessarily a strict requirement. In another aspect, the untransformed maps (LM response map, RPM response map, confidence map, etc.) may be used. If the maps are transformed, the transform need not be IPM. Moreover, not all maps need be transformed. When one or more maps are transformed, they may be transformed such that the maps have a common spatial domain, which can aid in masking the transformed and/or untransformed response maps (LM and/or RPM) with the transformed and/or untransformed confidence maps.

Referring back to FIG. 8, in block 850, the system may perform joint lane estimation, e.g., by using dynamic programming (DP), to detect the LMs and the RPMs present within the camera frame to estimate the multiple lane boundaries. In dynamic programming, a problem is decomposed into a set of subproblems, and the subproblems are efficiently solved recursively in terms of each other. Block 850 may correspond to the joint lane estimation stage 740 of FIG. 7.

Figure 16:
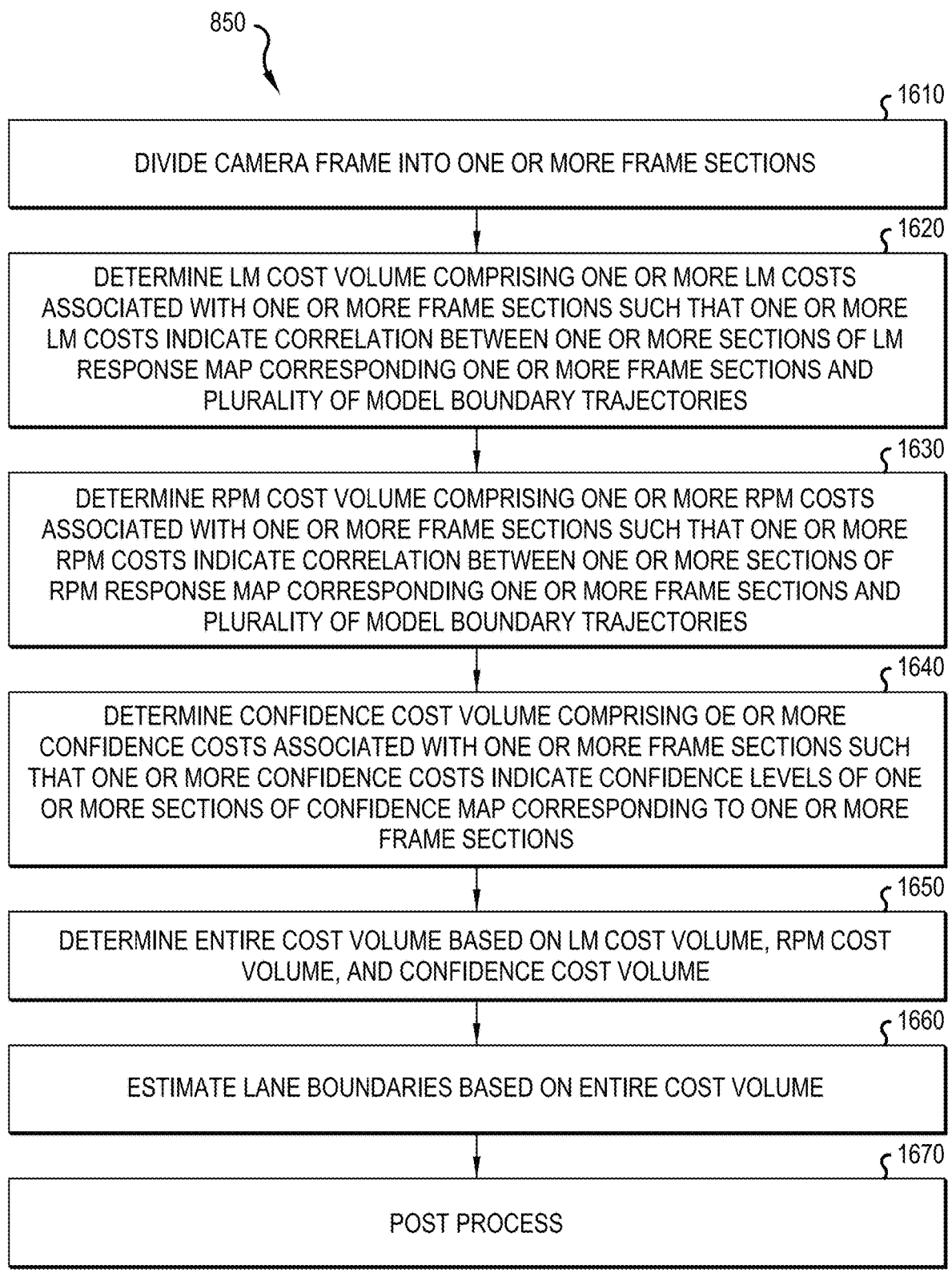
FIG. 16 illustrates a flow chart of an example process for performing joint lane estimation, according to aspects of the disclosure.

FIG. 16 illustrates a flow chart of a process to implement block 850 of FIG. 8. In this process, it may be assumed that there is a plurality of line models with each line model defining a line with a particular slope. By comparing the LM and/or RPM response maps with the plurality of line models, trajectories (or orientations) of the lane boundaries defined by the LMs and/or RPMs may be estimated. Thus, for clarity, the plurality of line models may also be referred to as a plurality of model boundary trajectories.

In block 1610, the system may divide the camera frame into one or more areas or sections referred to as frame sections. In block 1620, the system may determine an LM cost volume comprising one or more LM costs $C_L$ associated with the one or more frame sections. The one or more associated LM costs $C_L$ may indicate correlations between one or more sections of the LM response map corresponding to the one or more frame sections and the plurality of model boundary trajectories.

In block 1630, the system may determine an RPM cost volume comprising one or more RPM costs $C_R$ associated with the one or more frame sections. The one or more associated RPM costs $C_R$ may indicate correlations between one or more sections of the RPM response map corresponding to the one or more frame sections and the plurality of model boundary trajectories.

In block 1640, the system may determine confidence cost volume comprising one or more confidence costs $C_C$ associated with the one or more frame sections. The one or more associated confidence costs $C_C$ may indicate confidence levels of one or more sections of the confidence map corresponding to the one or more frame sections.

In an aspect, the LM, RPM, and confidence cost volumes may be respectively determined based on the transformed LM, RPM, and confidence response maps. For example, in block 1620 (1630), for each frame section, the associated LM (RPM) cost $C_L$ ($C_R$) may indicate a correlation between a section of the transformed LM (RPM) response map corresponding to that frame section and the plurality of model boundary trajectories. When the transformed (LM, RPM, confidence) maps have a common spatial domain, it may be advantageous to use the transformed maps in blocks 1620-1640 since the same section in each of the response maps can correspond to the same frame section.

It should be noted that "sections" for joint estimation purposes in blocks 1610-1640 should not be confused with "regions", e.g., for outlier rejection purposes discussed with respect to FIG. 15. In other words, the sections and regions may be totally independent of each other. Alternatively, the sections may be determined so as to minimize processing. For example, if a particular frame section only overlaps unreliable regions, then it may be unnecessary to process the corresponding sections of the LM, RPM, and/or confidence maps to determine the LM, RPM, and/or confidence costs, since lane boundaries are unlikely to be found in such section. That is, in this alternative, the sections that overlap reliable regions, at least in part, may be processed in blocks 1620, 1630, and/or 1640.

In block 1650, the system may determine an entire cost volume based on the LM cost volume, the RPM cost volume, and the confidence cost volume. For example, the LM cost volume, the RPM cost volume, and the confidence cost volume may be aggregated. In block 1660, the system finds one or more lane boundaries based on the entire cost volume. For example, the system may find LM and/or RPM trajectories. In block 1670, the system may perform post processing, e.g., to output results.

Figure 17:
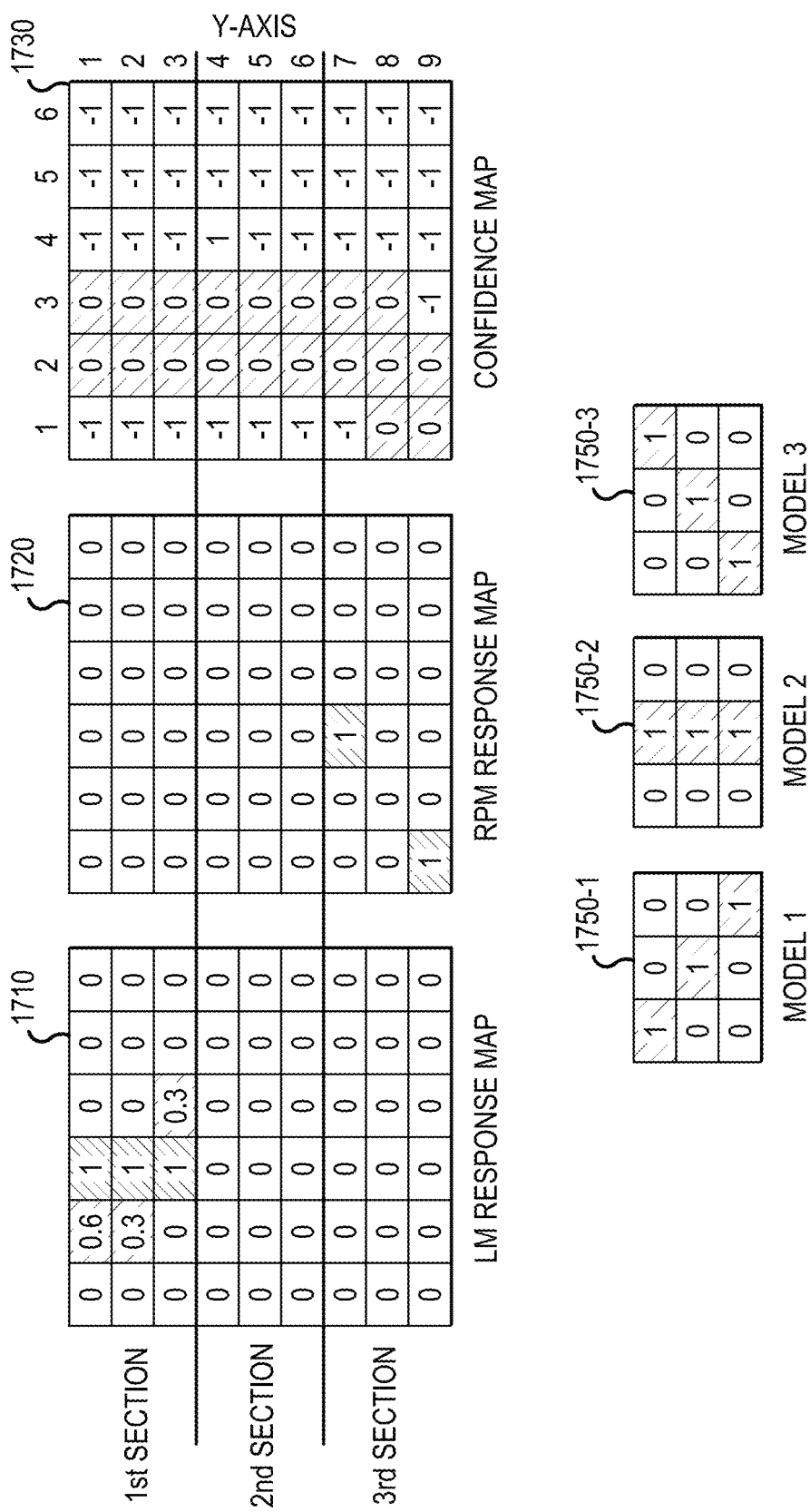
FIGS. 17-21 illustrate example results performing the joint lane estimation, according to the techniques described herein.

The process illustrated in FIG. 16 is explained with an example and with references to FIGS. 17-22. In FIG. 17, it is assumed that transformed maps (e.g., bird's eye views) are available, i.e., method 800 has entered block 850 (either from block 830 or 840). The size of each of the transformed LM response map 1710, the transformed RPM response map 1720, and the transformed confidence map 1730 is an array of 9×6 in this particular example. In general, the array may be of size (h×w) where h is the height (e.g., in pixels) and w is the width (e.g., also in pixels).

In this instance, the plurality of model boundary trajectories includes three model boundary trajectories (i.e., three line models) 1750-1, 1750-2, 1750-3 (collectively or singularly 1750). Each model boundary trajectory 1750 has a size of 3×3. In each model boundary trajectory, values of three pixels are 1 in different orientations (to define different rates of slope change). In general, model boundary trajectories can be a size n×m where n is a size of a section. To the extent that the section corresponds to a frame section, n may also describe a size of a frame section. Each of the transformed response maps 1710, 1720, and 1730 are sectionalized into multiple frame sections along the Y-axis. Thus, in general, the number of sections in a transformed response map will be $$\frac{\text{pixels along } Y\text{-axis}}{n}.$$

Based on the model boundary trajectories, the costs for the LM, RPM, and the confidence maps are computed (e.g., corresponding to blocks 1620, 1630, 1640). For the transformed LM and RPM response maps, a correlation value for each column, section, and model boundary trajectory is computed. For the LM and RPM response maps, two arrays each of size (P×Q×R) are defined where P=#columns−2, Q=#sections, and R=#model boundary trajectories, which in this instance is (4×3×3). These arrays may be referred to as the LM cost volume and the RPM cost volume.

Figure 18:
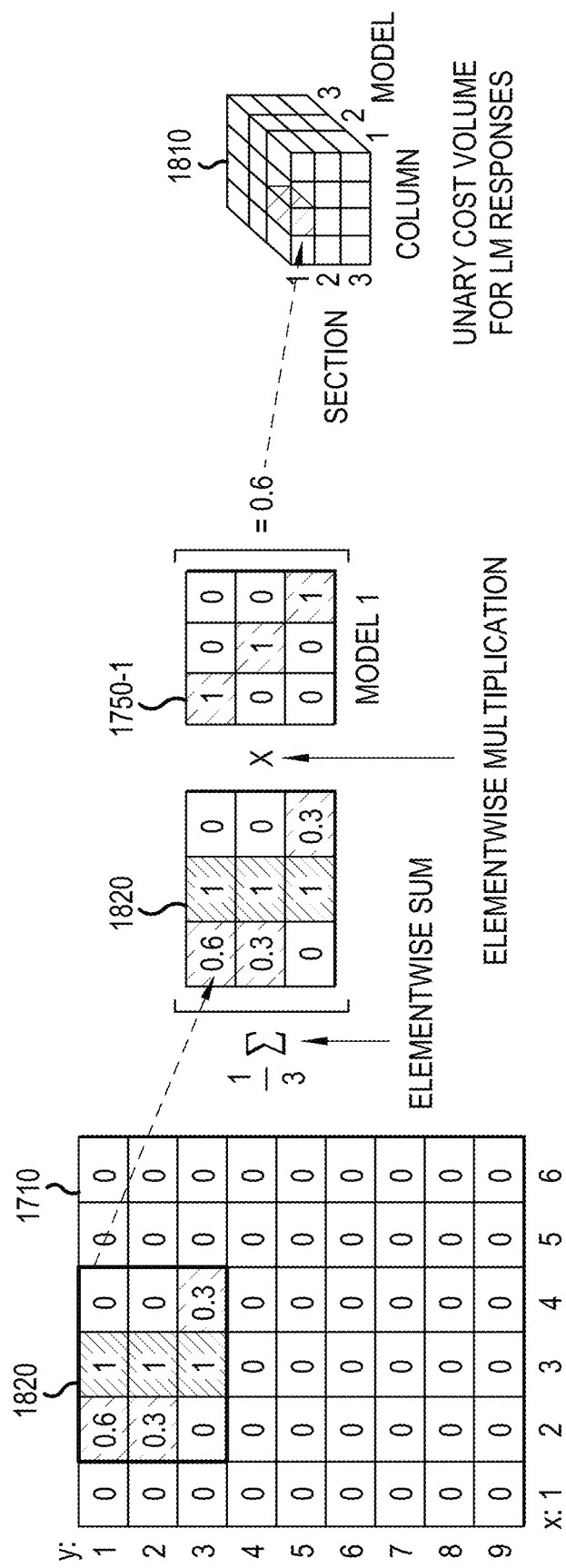

FIG. 18 illustrates an example of how an LM cost $C_L$, which is an element of the LM cost volume, may be calculated. Each LM cost may occupy a location (c, s, l) of the LM cost volume 1810, where c is the column, s is the section, and l is the model boundary trajectory 1750. Note that there are four columns (P=4) in the LM cost volume 1810. This is due to the widths of the model boundary trajectories (m=3). Generally, the P=w (m+1), where w is the width of the transformed LM response map 1710 and m is the width of the model boundary trajectory 1750. Therefore, in this particular instance, first column, c=1, of the LM cost volume 1810 corresponds second column of pixels, x=2, in the transformed LM response map 1710.

FIG. 18 illustrates an example of computing the correlation of a pixel (3,2) in the transformed LM response map 1710 with the first model boundary trajectory 1750-1 (e.g., (c,s,l)=(2,1,1)). For example, a subarray 1820 of size n−m (same size as the model boundary trajectory) centered at the pixel (3,2) may be elementwise multiplied with the first model boundary trajectory 1750-1 and the resulting multiplications may be summed. In this instance, the resulting sum is 1.9=(0.6×1)+(1×1)+(0.3×1). Since the resulting sum is over one model boundary trajectory 1750-1, the resulting sum may be divided by the number of model boundary trajectories 1750 (three in this instance) to arrive at the correlation value $C_L$=0.6333. (shortened to 0.6 depending on desired precision). The computed correlation value is saved at location (2,1,1) as the LM cost $C_L$ in the LM cost volume 1810. Similar calculations may be made to determine other LM costs $C_L$. Note that the size of the LM cost volume 1810 is smaller than the transformed LM response map 1710. Thus, the LM cost volume 1810 is a compact way to capture the features of interest to estimate the LMs.

Alternatively, when the calculated correlation value is over an LM cost threshold (e.g., 0.5), the corresponding LM cost may be assigned a maximum LM cost value (e.g., 1). This may increase the LM detection performance.

While not shown, the RPM cost volume can be populated in a manner similar to populating the LM cost volume 1810. That is, an individual RPM cost $C_R$ (an element of the RPM cost volume) may be computed with correlation values of the pixel with one of the model boundary trajectories. Alternatively, when the correlation value is over an RPM cost threshold (e.g., 0.5), the RPM cost $C_R$ may be assigned a maximum RPM cost value (e.g., 1). This can increase the RPM detection performance.

Figure 19:
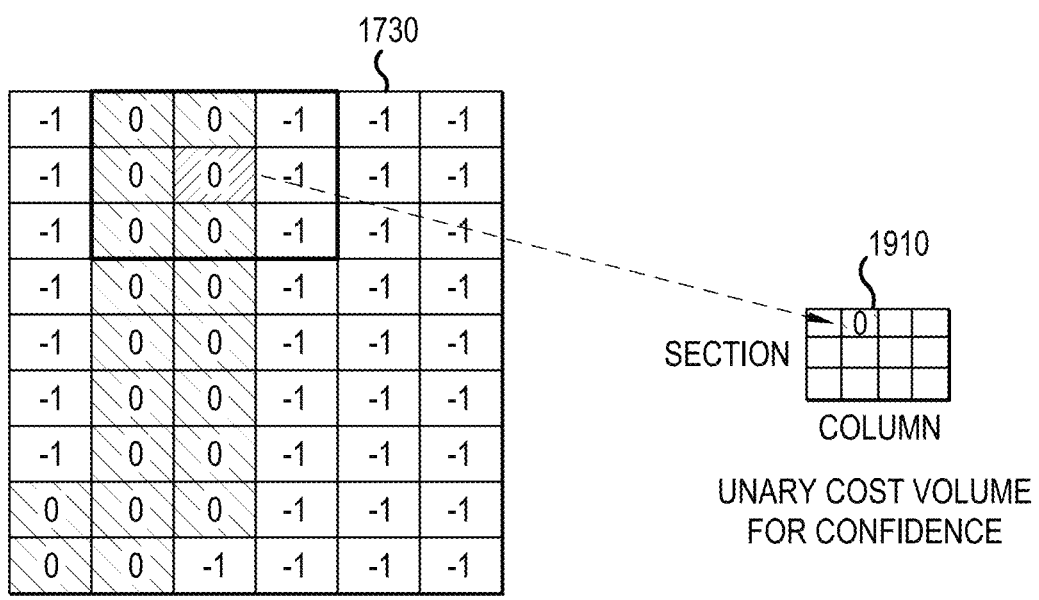

FIG. 19 illustrates an example of how a confidence cost $C_C$, which is an element of the confidence cost volume, may be calculated. In an aspect, the transformed confidence map 1910 need not be correlated with the model boundary trajectories, i.e., the confidence costs can be independent of the model boundary trajectories. Therefore, the confidence cost volume 1910 can be a size (P×Q), which in this instance is (4×3). Note that the confidence cost volume 1910 can be significantly smaller than the transformed confidence map 1730. For fast computation, the center value can be assigned to the cost of the transformed confidence map. For example, the value of pixel (3,2) in the transformed confidence map 1730 can be saved at location (2,1) in the confidence cost volume 1910.

Having computed the LM cost volume, the RPM cost volume, and the confidence cost volume, the entire cost volume may be determined. The entire cost volume may also be of size (P×Q×R), which is (4×3×3) in the example. In an aspect, each element of the entire cost volume may represent an aggregation of the corresponding elements of the LM cost volume, the RPM cost volume, and the confidence cost volume calculated through an energy function. That is, E(c, s, l) can be calculated for each element of the entire cost volume. In an aspect, each energy E(c, s, l) may be calculated as follows:

$$E(c,s,l)=\max_{c_p,l_p}(\lambda_L C_L(c,s,l)+\lambda_R C_R(c,s,l)+\lambda_C C_C(c,s)+\lambda_S C_S(l,l_p)+E(c_p,s-1,l_p)),$$

in which $C_L$ represents a cost for LM responses (LM cost), $C_R$ represents a cost for RPM responses (RPM cost), $C_C$ represents a cost for confidence (confidence cost), $C_S(l, l_p)=|l-l_p|$ represents a pairwise cost (or smoothness cost), and $\lambda_L$, $\lambda_R$, $\lambda_C$ are user-defined constants. The aggregation may be performed in ascending order of the sections.

Figure 20:
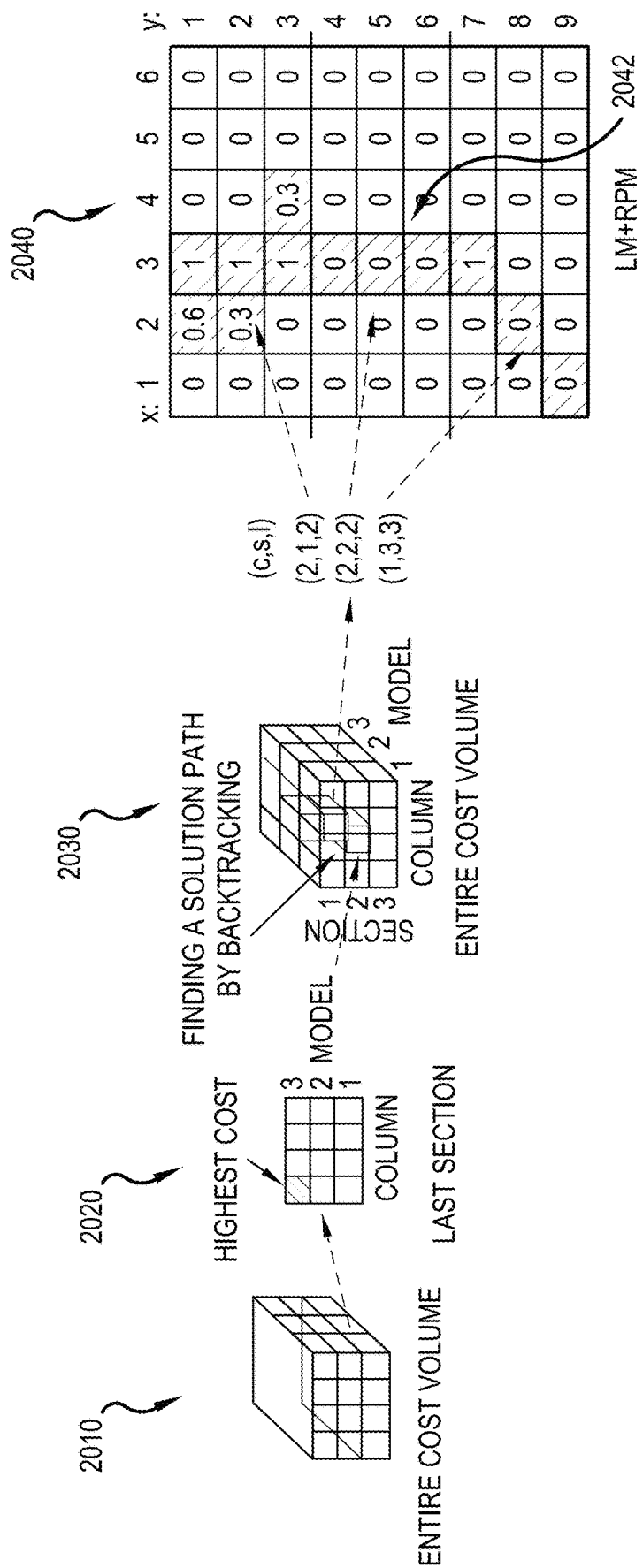

The LM and the RPM trajectories may be found from the entire cost volume as illustrated in FIG. 20. Starting from the last section (section 3 in this example), the coordinate with the highest cost (highest energy) within the section may be selected. The solution path may then be found by backtracking. On the right of FIG. 20, a composite transformed map 2040, which is a composition of the transformed LM and RPM response maps, illustrates an example progress of finding the solution path (e.g., finding the LM and RPM trajectories). A lane boundary 2042 is drawn (highlighted in the composite transformed image map 2040) by the model boundary trajectories selected at each section of the solution path.

In this particular example, the order of elements selected from the entire cost volume 2010 is (1,3,3), (2,2,2), and (2,1,2), which correspond to the solution path highlighted in the composite transformation map 2040. Starting at the last section, i.e., s=3, element (1,3,3) of the entire cost volume 2010 is selected, which corresponds to a subarray centered at pixel (x,y)=(2,8) of the composite transformed map 2040. Since l=3 in the selected element, this indicates that the trajectory of the lane boundary (defined by one or more lane markers and/or one or more raised pavement markers) at this pixel location most closely correlates with the third model boundary trajectory 1750-3.

In the next section, i.e., s=2, element (2,2,2) of the entire cost volume 2010 is selected. Since the lane or lane boundary 2042 should be contiguous across sections, this means that among the twelve elements in the second section of the entire cost volume 2010, some of the elements may be eliminated from consideration. For example, element (1,2,1) need not be considered since selecting this element would result in the lane boundary 2042 being discontinuous between third and second sections. Thus, the selected element (2,2,2) may be the element with the highest cost among the elements of the second section that enable the lane boundary 242 to be contiguous from section 3. Finally, the element (2,1,2) may be the element of the first section of the entire cost volume 2040 that enable the contiguous nature of the lane boundary 242 to be maintained.

Recall that there can be multiple lane boundaries in the camera frame, meaning that there can be multiple paths or lanes. By applying a non-maximum suppression algorithm, multiple paths can be selected.

The joint lane estimation differs from conventional techniques in at least the following manner. Existing techniques perform in sequence extracting lines, clustering lines, fitting lanes, and selecting lanes. However, proposed joint lane estimation using DP may perform all of those steps simultaneously. Note that lines can include both LMs and RPMs. Existing techniques do not detect both LMs and RPMs simultaneously.

Figure 21:
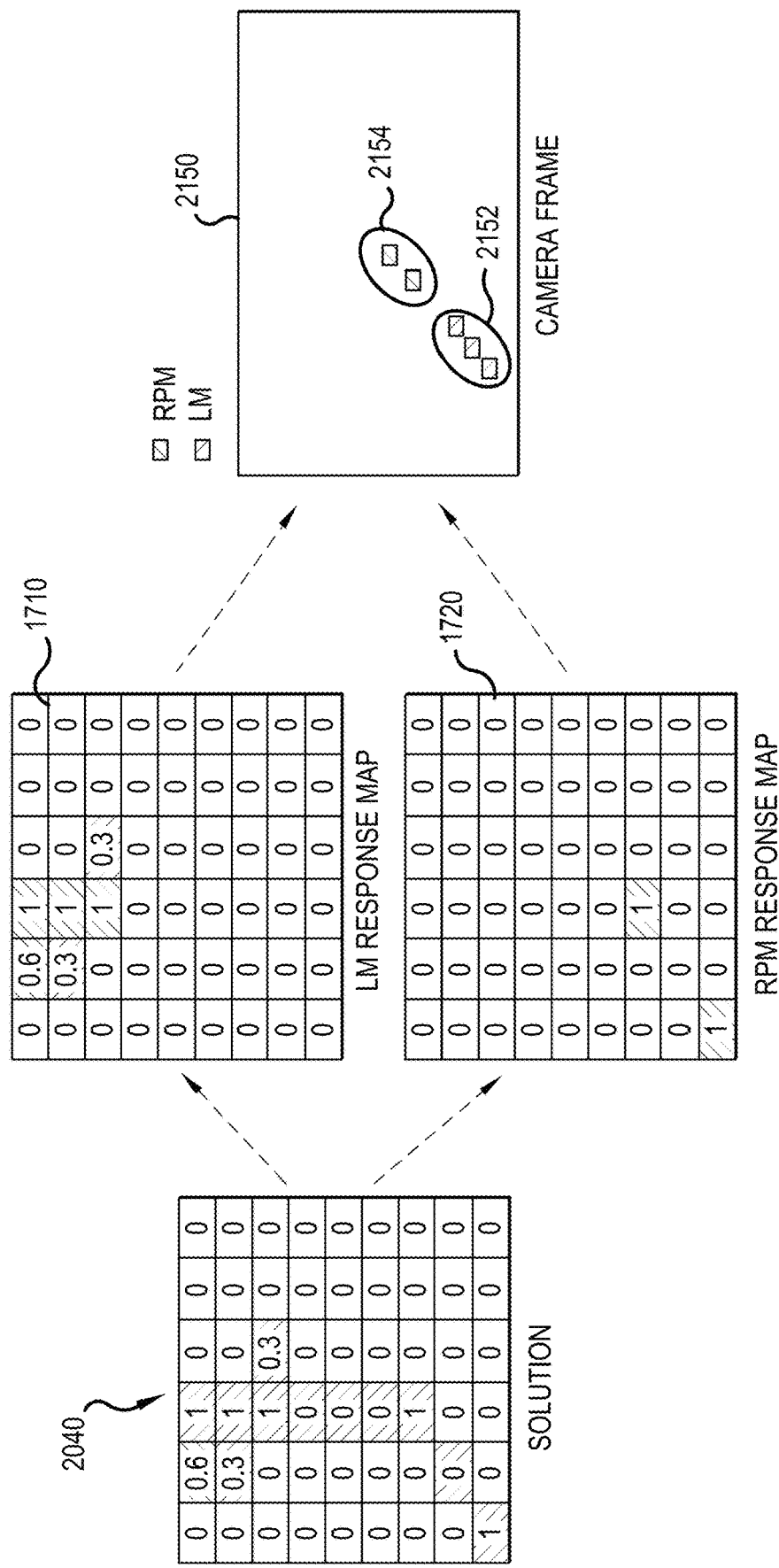

FIG. 21 illustrates an example of post-processing. In post-processing, the pixels with high costs are found on the solution path. For example, if an LM or RPM cost of a pixel is higher than an LM or RPM threshold (e.g., 0.3), the pixel is determined to be a pixel of an LM or an RPM. After finding the LM and the RPM coordinates in the transformed LM and RPM maps 1710, 1720, those coordinates are reverse transformed into the coordinates of the camera frame 2150. As seen, ovals surround LMs 2152 and RPMs 2154 within the camera frame 2150. The coordinates of the camera frame for the LMs 2152 and/or the RPMs 2154 can be regarded as an output of the process of the method 800 of FIG. 8.

Figure 22:
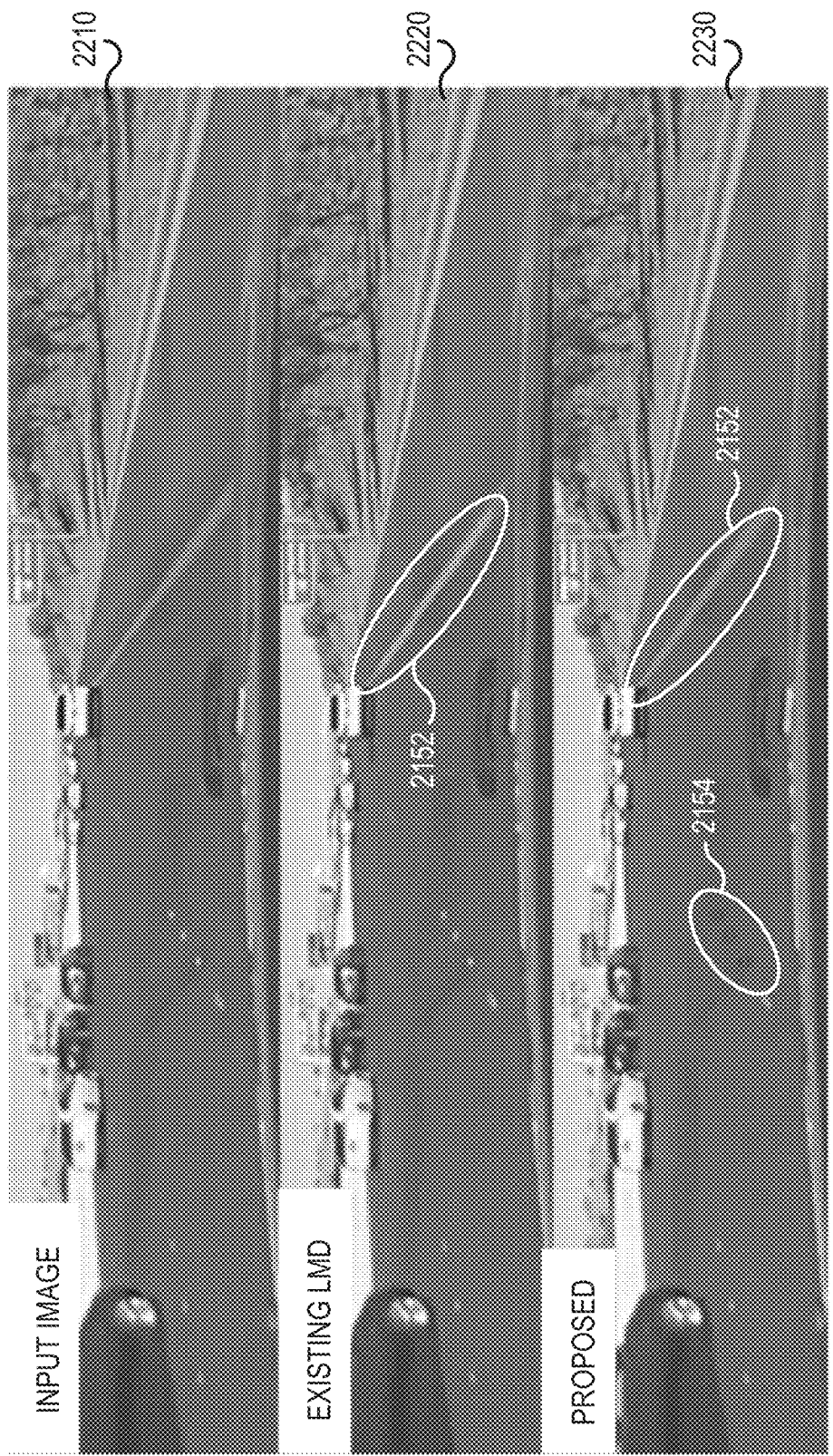
FIG. 22 illustrates example output images of conventional and proposed techniques for lane estimation.

FIG. 22 illustrates a comparison between conventional and proposed techniques. FIG. 22 includes an input image (e.g., camera frame) 2210, output 2220 of conventional LMD technique, and output 2230 of the proposed technique. As seen, in the conventional technique, at best, only the lane markers are detected, i.e., only the lane markers 2152 (line on the right) are highlighted as seen in the conventional output 2220. But in the proposed technique, both the lane markers and raised pavement markers are detected, i.e., both lane markers 2152 and the raised pavement markers 2154 (heavy dots) are highlighted. Moreover, the lane markers 2152 and the raised pavement markers 2154 are simultaneously, or at least contemporaneously, detected. Therefore, a more optimal estimation of multiple lane boundaries is possible with the proposed technique.

Recall that in the method 800 of FIG. 8, LM and RPM response maps were generated based on a same camera frame. However, it is also contemplated that the camera frames for generation of the LM and RPM response maps need not be the same. In other words, different camera frames (e.g., first and second camera frames from first and second cameras) may be used. Whether a single camera frame or multiple camera frames are used, there can be advantages and disadvantages to both. For example, a greater flexibility may be available when two different camera frames (captured by two different cameras) are used to generate the LM and RPM responses. On the other hand, when a single camera frame is used to generate both the LM and RPM responses, then there would be no need to calibrate the multiple cameras.

Figure 23:
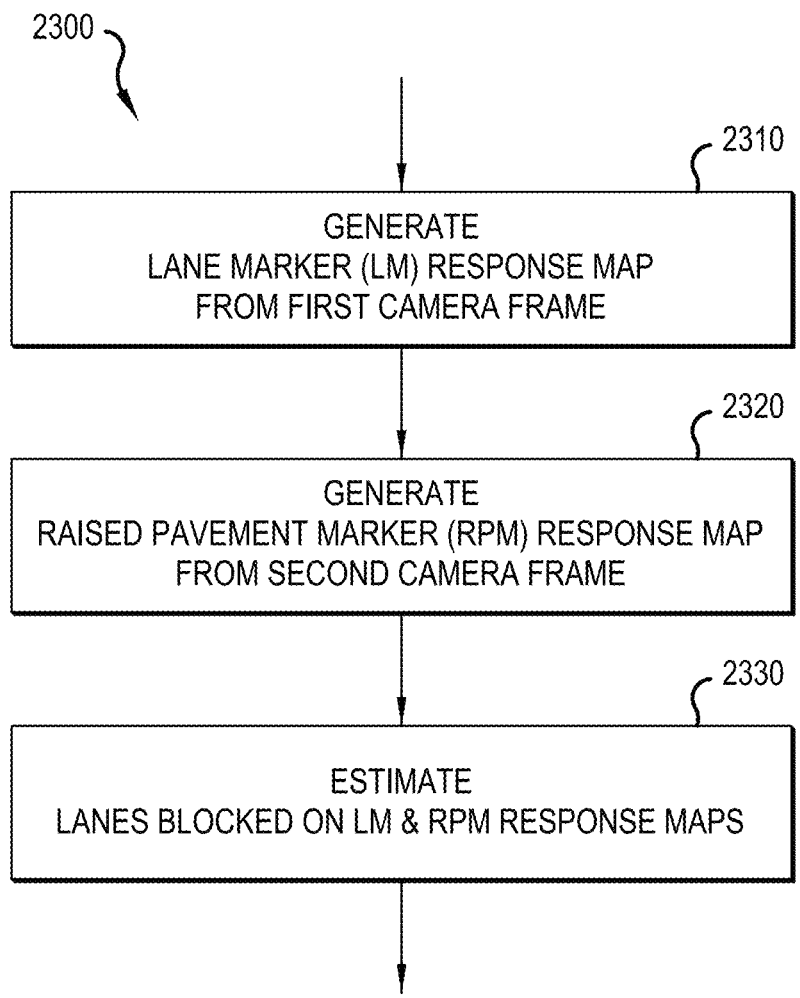
Figure 24A:
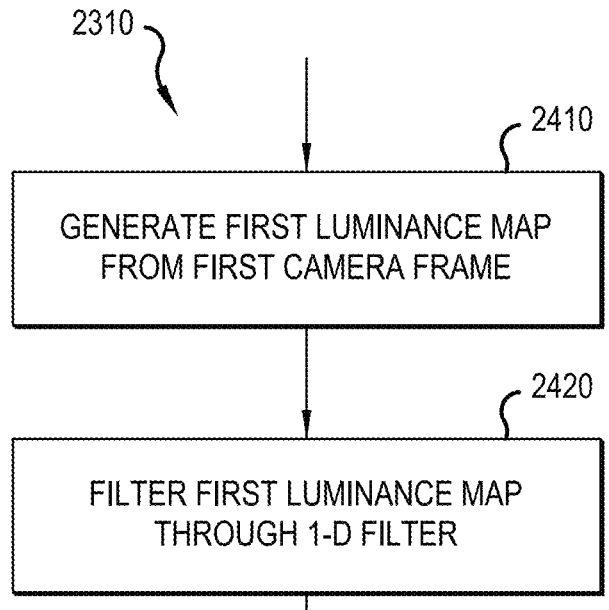

FIG. 23 illustrates a flow chart of an example method 2300 performed by the system to estimate one or more lane boundaries in one or more camera frames. The method 2300 may be viewed as a more general form of the method 800. In block 2310, the system may generate an LM response map from a first camera frame. FIG. 24A illustrates a flow chart of an example process to implement block 2310. In block 2410, the system may generate a first luminance map, i.e., a first grayscale map, from the first camera frame. In block 2420, the system may filter the first luminance map through a 1-D filter to generate the LM response map. The 1-D filter may be a 1-D horizontal or a 1-D vertical filter described above.

Figure 24B:
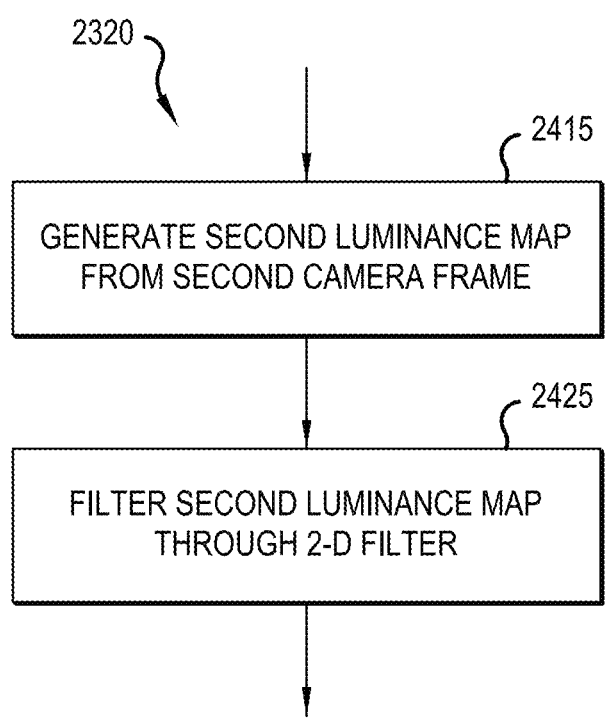

Referring back to FIG. 23, in block 2320, the system may generate an RPM response map from a second camera frame. FIG. 24B illustrates a flow chart of an example process to implement block 2320. In block 2415, the system may generate a second luminance map from the second camera frame. In block 2425, the system may filter the second luminance map through a 2-D filter to generate the RPM response map. In an aspect, filtering through two 1-D filters (e.g., 1-D horizontal and 1-D vertical filters) and combining the filtering results may be an example of 2-D filtering. If the first and second camera frames are the same, then blocks 2310, 2320 may be equivalent to block 810.

Figure 25:
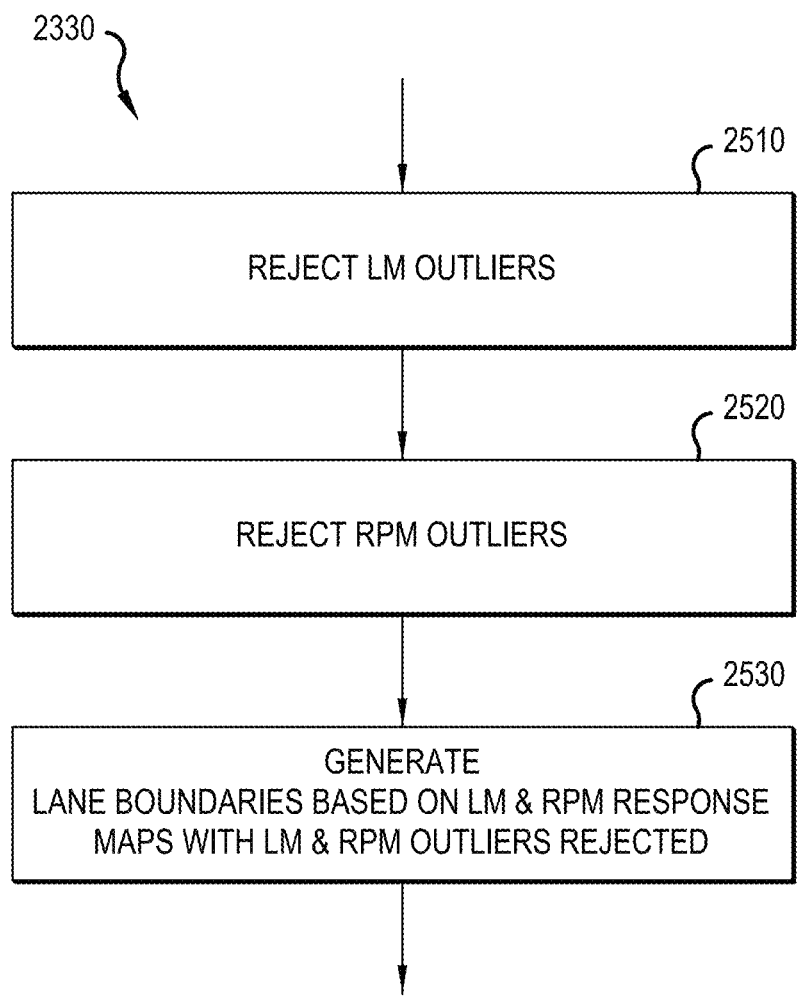

Referring back to FIG. 23, in block 2330, the system may estimate lanes based on the LM and RPM response maps. FIG. 25 illustrates a flow chart of an example process to implement block 2330. In block 2510, the system may reject LM outliers. FIG. 26A illustrates a flow chart of a process to implement block 2510. In block 2610, the system may derive an LM confidence map (see also FIG. 10-12). The LM confidence map may comprise one or more LM confidence regions corresponding to one or more regions of the first camera frame. Each LM confidence region may have an associated LM confidence level indicating a probability that at least one LM will be within the corresponding region of the first camera frame. The LM confidence map may be derived in a variety of ways, e.g., through DNN by processing one or more prior frames, through a lane tracker process, through a classifier (e.g., trained through SVM training with histogram of HOG features), etc.

In block 2620, the system may transform the LM confidence map into a transformed LM map and/or transform the LM response map into a transformed LM response map. The transformation may be such that the spatial domain of the transformed LM confidence map is the same as the spatial domain of the transformed LM response map. In other words, the transformed LM confidence and response maps have a common spatial domain (e.g., birds eye view). In an aspect, an inverse perspective mapping (IPM) transform may be applied to the LM confidence and/or LM response maps.

In block 2630, the system may reject LM outliers (see also FIG. 15). The LM outliers may comprise one or more LMs within the LM response map corresponding to at least one LM confidence region of the LM confidence map whose associated confidence level is less than an LM confidence threshold. In an aspect, the outliers may be rejected masking the transformed LM response map with the transformed LM confidence map.

Referring back to FIG. 25, in block 2520, the system may reject RPM outliers. FIG. 26B illustrates a flow chart of an example process to implement block 2520. In block 2615, the system may derive an RPM confidence map. The RPM confidence map may comprise one or more RPM confidence regions corresponding to one or more regions of the second camera frame. Each RPM confidence region may have an associated RPM confidence level indicating a probability that at least one RPM will be within the corresponding region of the first camera frame. The RPM confidence map may be derived in a variety of ways, e.g., through DNN by processing one or more prior frames, through a lane tracker process, through a classifier (e.g., trained through SVM training with histogram of HOG features), etc.

In block 2625, the system may transform the RPM confidence map into a transformed RPM map and/or transform the RPM response map into a transformed RPM response map. The transformation may be such that the spatial domain of the transformed RPM confidence map is the same as the spatial domain of the transformed RPM response map. In other words, the transformed RPM confidence and response maps have a common spatial domain. In an aspect, IPM transform may be applied to the RPM confidence response maps. However, to transform the RPM response map, RPM candidate points may be extracted from the RPM response map (e.g., through template matching, SVM classifier with HOG feature descriptors, etc., see FIG. 14). Then the coordinates of the extracted RPM candidate points may be transformed by applying IPM to corresponding coordinates of the RPM response map. The transformed coordinates may then be assigned an RPM detection value.

In block 2635, the system may reject RPM outliers. The RPM outliers may comprise one or more RPMs within the RPM response map corresponding to at least one RPM confidence region of the RPM confidence map whose associated confidence level is less than an RPM confidence threshold. In an aspect, the outliers may be rejected masking the transformed RPM response map with the transformed LM confidence map.

Referring back to FIG. 25, in block 2530, the system may reject RPM outliers. When the first and second camera frames are the same, then the process illustrated in FIG. 16 may be an example implementation of block 2530.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of estimating lanes, the method comprising:
generating a lane marker (LM) response map from a first camera frame, the LM response map indicating presence of one or more LMs within the first camera frame;
generating a raised pavement marker (RPM) response map from a second camera frame, the RPM response map indicating presence of one or more RPMs within the second camera frame; and
estimating the lanes based on the LM response map and the RPM response map.

2. The method of claim 1, wherein generating the LM response map comprises:
generating a first luminance map from the first camera frame; and
filtering the first luminance map through a 1-D filter.

3. The method of claim 1, wherein generating the RPM response map comprises:
generating a second luminance map from the second camera frame; and
filtering the second luminance map through a 2-D filter.

4. The method of claim 1, wherein estimating the lanes comprises:
rejecting LM outliers from the LM response map;
rejecting RPM outliers from the RPM response map; and
estimating lane boundaries of the lanes based on the LM and RPM response maps with the LM and/or RPM outliers rejected.

5. The method of claim 4,
wherein rejecting the LM outliers comprises:
deriving an LM confidence map comprising one or more LM confidence regions corresponding to one or more regions of the first camera frame, each LM confidence region having an associated LM confidence level indicating a probability that at least one LM will be within the corresponding region of the first camera frame; and
rejecting LM outliers based on the LM confidence map, the LM outliers comprising one or more LMs within the LM response map corresponding to at least one LM confidence region of the LM confidence map whose associated confidence level is less than an LM confidence threshold, and
wherein rejecting the RPM outliers comprises:
deriving an RPM confidence map comprising one or more RPM confidence regions corresponding to one or more regions of the second camera frame, each RPM confidence region having an associated RPM confidence level indicating a probability that at least one RPM will be within the corresponding region of the second camera frame; and
rejecting RPM outliers based on the RPM confidence map, the RPM outliers comprising one or more RPMs within the RPM response map corresponding to at least one RPM confidence region of the RPM confidence map whose associated confidence level is less than an RPM confidence threshold.

6. The method of claim 5, further comprising:
transforming the LM confidence map and the LM response map respectively into a transformed LM confidence map and a transformed LM response map such that a spatial domain of the transformed LM confidence map is the same as a spatial domain of the transformed LM response map; and/or
transforming the RPM confidence map and the RPM response map respectively into a transformed RPM confidence map and a transformed RPM response map such that a spatial domain of the transformed RPM confidence map is the same as a spatial domain of the transformed RPM response map, wherein rejecting the LM outliers comprises masking the transformed LM response map with the transformed LM confidence map, and/or wherein rejecting the RPM outliers comprises masking the transformed RPM response map with the transformed RPM confidence map.

7. The method of claim 6, wherein transforming the LM confidence map comprises applying an inverse perspective mapping (IPM) transform on the LM confidence map, wherein transforming the LM response map comprises applying the IPM transform on the LM response map, wherein transforming the RPM confidence map comprises applying the IPM transform on the RPM confidence map, and wherein transforming the RPM response map comprises:
  extracting RPM candidate points from the RPM response map, each RPM candidate point indicating a location of a RPM;
  applying the IPM transform on coordinates of the extracted RPM candidate points; and
  assigning an RPM detection value to the transformed coordinates in the transformed RPM response map, the RPM detection value indicating RPM detection at the transformed coordinate.

8. The method of claim 7, wherein extracting the RPM candidate points from the RPM response map comprises:
  matching the RPM response map with one or more RPM templates, each RPM template defining a RPM shape; and/or
  processing the RPM response map through a support vector machine (SVM) classifier that has been trained based on histogram of oriented gradients (HOG) features.

9. The method of claim 5, wherein the first and second frames are a same camera frame and the LM and RPM confidence maps are a same confidence map, and wherein estimating the lane boundaries comprises:
  dividing the camera frame into one or more frame sections;
  determining an LM cost volume comprising one or more LM costs associated with the one or more frame sections such that the one or more associated LM costs indicate correlations between one or more sections of the LM response map corresponding to the one or more frame sections and a plurality of model boundary trajectories;
  determining an RPM cost volume comprising one or more RPM costs associated with the one or more frame sections such that the one or more associated RPM costs indicate correlations between one or more sections of the RPM response map corresponding to the one or more frame sections and the plurality of model boundary trajectories;
  determining a confidence cost volume comprising one or more confidence costs associated with the one or more frame sections such that the one or more associated confidence costs indicate confidence levels of one or more sections of the confidence map corresponding to the one or more frame sections;
  determining an entire cost volume comprising an aggregation of the LM cost volume, the RPM cost volume, and the confidence cost volume; and
  estimating the lane boundaries based on the entire cost volume.

10. The method of claim 9, wherein the LM response map with the LM outliers removed is used when determining the LM cost volume, and/or wherein the RPM response map with the RPM outliers removed is used when determining the RPM cost volume.

11. The method of claim 9, further comprising:

transforming the confidence map into a transformed confidence map;

transforming the LM response map into a transformed LM response map; and transforming the RPM response map into a transformed RPM response map, wherein the transformed confidence map, the transformed LM response map, and the transformed RPM response map are all transformed to have a common spatial domain, and wherein the LM cost volume is determined based on the transformed LM response map, the RPM cost volume is determined based on the transformed RPM response map, and the confidence cost volume is determined based on the transformed confidence map.

12. The method of claim 11, wherein the plurality of model boundary trajectories comprises a plurality of line models, each line model having a size n×m and representing a slope, wherein each LM cost indicates a correlation between the section of the transformed LM response map corresponding to one of the plurality of sections and the slope of a line model of the plurality of line models, and/or wherein each RPM cost indicates a correlation between the section of the transformed RPM response map corresponding to one of the plurality of sections and the slope of a line model of the plurality of line models.

13. The method of claim 11, wherein estimating the lane boundaries comprises:
  determining one or more LM trajectories and one or more RPM trajectories based on the entire cost volume.

14. An apparatus, comprising:

a memory; and a processor communicatively coupled to the memory, wherein the memory and/or the processor are configured to:
  generate a lane marker (LM) response map from a first camera frame, the LM response map indicating presence of one or more LMs within the first camera frame;
  generate a raised pavement marker (RPM) response map from a second camera frame, the RPM response map indicating presence of one or more RPMs within the second camera frame; and
  estimate the lanes based on the LM response map and the RPM response map.

15. The apparatus of claim 14, wherein in generating the LM response map, the memory and/or the processor are configured to:
  generate a first luminance map from the first camera frame; and
  filter the first luminance map through a 1-D filter.

16. The apparatus of claim 14, wherein in generating the RPM response map, the memory and/or the processor are configured to:
generate a second luminance map from the second camera frame; and
filter the second luminance map through a 2-D filter.

17. The apparatus of claim 14, wherein in estimating the lanes, the memory and/or the processor are configured to:
reject LM outliers from the LM response map;
reject RPM outliers from the RPM response map; and
estimate lane boundaries of the lanes based on the LM and RPM response maps with the LM and/or RPM outliers rejected.

18. The apparatus of claim 14,
wherein in rejecting the LM outliers, the memory and/or the processor are configured to:
derive an LM confidence map comprising one or more LM confidence regions corresponding to one or more regions of the first camera frame, each LM confidence region having an associated LM confidence level indicating a probability that at least one LM will be within the corresponding region of the first camera frame; and
reject LM outliers based on the LM confidence map, the LM outliers comprising one or more LMs within the LM response map corresponding to at least one LM confidence region of the LM confidence map whose associated confidence level is less than an LM confidence threshold, and
wherein in rejecting the RPM outliers, the memory and/or the processor are configured to:
derive an RPM confidence map comprising one or more RPM confidence regions corresponding to one or more regions of the second camera frame, each RPM confidence region having an associated RPM confidence level indicating a probability that at least one RPM will be within the corresponding region of the second camera frame; and
reject RPM outliers based on the RPM confidence map, the RPM outliers comprising one or more RPMs within the RPM response map corresponding to at least one RPM confidence region of the RPM confidence map whose associated confidence level is less than an RPM confidence threshold.

19. The apparatus of claim 18, wherein the memory and/or the process are further configured to:
transform the LM confidence map and the LM response map respectively into a transformed LM confidence map and a transformed LM response map such that a spatial domain of the transformed LM confidence map is the same as a spatial domain of the transformed LM response map; and/or
transform the RPM confidence map and the RPM response map respectively into a transformed RPM confidence map and a transformed RPM response map such that a spatial domain of the transformed RPM confidence map is the same as a spatial domain of the transformed RPM response map,
wherein in rejecting the LM outliers, the memory and/or the processor are configured to mask the transformed LM response map with the transformed LM confidence map, and/or
wherein in rejecting the RPM outliers, the memory and/or the processor are configured to mask the transformed RPM response map with the transformed RPM confidence map.

20. The apparatus of claim 19,
wherein the memory and/or the processor are configured to transform the LM confidence map, the LM response map, and the RPM confidence map by applying an inverse perspective mapping (IPM) transform respectively on the LM confidence map, the LM response map, and the RPM confidence map, and
wherein in transforming the RPM response map, the memory and/or the processor are configured to:
extract RPM candidate points from the RPM response map, each RPM candidate point indicating a location of a RPM;
apply the IPM transform on coordinates of the extracted RPM candidate points; and
assign an RPM detection value to the transformed coordinates in the transformed RPM response map, the RPM detection value indicating RPM detection at the transformed coordinate.

21. The apparatus of claim 20, wherein in extracting the RPM candidate points from the RPM response map, the memory and/or the processor are configured to:
match the RPM response map with one or more RPM templates, each RPM template defining a RPM shape; and/or
process the RPM response map through a support vector machine (SVM) classifier that has been trained based on histogram of oriented gradients (HOG) features.

22. The apparatus of claim 18,
wherein the first and second frames are a same camera frame and the LM and RPM confidence maps are a same confidence map, and
wherein in estimating the lane boundaries, the memory and/or the processor are configured to:
dividing the camera frame into one or more frame sections;
determining an LM cost volume comprising one or more LM costs associated with the one or more frame sections such that the one or more associated LM costs indicate correlations between one or more sections of the LM response map corresponding to the one or more frame sections and a plurality of model boundary trajectories;
determining an RPM cost volume comprising one or more RPM costs associated with the one or more frame sections such that the one or more associated RPM costs indicate correlations between one or more sections of the RPM response map corresponding to the one or more frame sections and the plurality of model boundary trajectories;
determining a confidence cost volume comprising one or more confidence costs associated with the one or more frame sections such that the one or more associated confidence costs indicate confidence levels of one or more sections of the confidence map corresponding to the one or more frame sections;
determining an entire cost volume comprising an aggregation of the LM cost volume, the RPM cost volume, and the confidence cost volume; and
estimating the lane boundaries based on the entire cost volume.

23. The apparatus of claim 22, wherein the memory and/or the processor are configured to:
use the LM response map with the LM outliers removed when determining the LM cost volume, and/or
use the RPM response map with the RPM outliers removed when determining the RPM cost volume.

24. The apparatus of claim 22
wherein the memory and/or the processor are further configured to:
  transform the confidence map into a transformed confidence map;
  transform the LM response map into a transformed LM response map; and
  transform the RPM response map into a transformed RPM response map,
wherein the transformed confidence map, the transformed LM response map, and the transformed RPM response map are all transformed to have a common spatial domain, and
wherein the memory and/or the processor are configured to:
  determine the LM cost volume based on the transformed LM response map;
  determine the RPM cost volume based on the transformed RPM response map; and
  determine the confidence cost volume based on the transformed confidence map.

25. The apparatus of claim 24,
wherein the plurality of model boundary trajectories comprises a plurality of line models, each line model having a size n×m and representing a slope,
wherein each LM cost indicates a correlation between the section of the transformed LM response map corresponding to one of the plurality of sections and the slope of a line model of the plurality of line models, and/or
wherein each RPM cost indicates a correlation between the section of the transformed RPM response map corresponding to one of the plurality of sections and the slope of a line model of the plurality of line models.

26. The apparatus of claim 24, wherein in estimating the lane boundaries, the memory and/or the processor are configured to determine one or more LM trajectories and one or more RPM trajectories based on the entire cost volume.

27. An apparatus, comprising:
a processor configured to:
  generate a lane marker (LM) response map from a first camera frame, the LM response map indicating presence of one or more LMs within the first camera frame;
  generate a raised pavement marker (RPM) response map from a second camera frame, the RPM response map indicating presence of one or more RPMs within the second camera frame; and
  estimate the lanes based on the LM response map and the RPM response map.

28. The apparatus of claim 27,
wherein in generating the LM response map, the processor is configured to:
  generate a first luminance map from the first camera frame; and
  filter the first luminance map through a 1-D filter, and
wherein in generating the RPM response map, the processor is configured to:
  generate a second luminance map from the second camera frame; and
  filter the second luminance map through a 2-D filter.

29. The apparatus of claim 27, wherein in estimating the lanes, the processor is configured to:
  reject LM outliers from the LM response map;
  reject RPM outliers from the RPM response map; and
  estimate lane boundaries of the lanes based on the LM and RPM response maps with the LM and/or RPM outliers rejected.

30. A non-transitory computer-readable medium storing computer-executable instructions for an apparatus, the computer-executable instructions comprising:
  one or more instructions causing the apparatus to generate a lane marker (LM) response map from a first camera frame, the LM response map indicating presence of one or more LMs within the first camera frame;
  one or more instructions causing the apparatus to generate a raised pavement marker (RPM) response map from a second camera frame, the RPM response map indicating presence of one or more RPMs within the second camera frame; and
  one or more instructions causing the apparatus to estimate the lanes based on the LM response map and the RPM response map.

* * * * *